(12) United States Patent
Jaunarajs et al.

(10) Patent No.: US 9,494,414 B2
(45) Date of Patent: Nov. 15, 2016

(54) TOOL MEASURING APPARATUS FOR MOUNTING SURFACE TO CAST SHADOW

(71) Applicant: Integrated Packaging Solutions, LLC, Wheatridge, CO (US)

(72) Inventors: Kalvis Jaunarajs, Littleton, CO (US); Michael W. Calahan, Wheatridge, CO (US); Kevin M. Gillest, Wheatridge, CO (US)

(73) Assignee: INTEGRATED PACKAGING SOLUTIONS, LLC, Wheatridge, CO (US)

(*) Notice: Subject to any disclaimer, the term of this patent is extended or adjusted under 35 U.S.C. 154(b) by 244 days.

(21) Appl. No.: 14/522,752

(22) Filed: Oct. 24, 2014

(65) Prior Publication Data

US 2015/0137013 A1   May 21, 2015

Related U.S. Application Data

(60) Provisional application No. 61/905,524, filed on Nov. 18, 2013.

(51) Int. Cl.
| | |
|---|---|
| *G01B 11/24* | (2006.01) |
| *G01B 11/02* | (2006.01) |
| *G01B 11/14* | (2006.01) |
| *G01B 11/12* | (2006.01) |

(52) U.S. Cl.
CPC ........... *G01B 11/02* (2013.01); *G01B 11/2433* (2013.01); *G01B 11/12* (2013.01); *G01B 11/14* (2013.01); *G01B 11/24* (2013.01)

(58) Field of Classification Search
CPC ....... G01B 11/02; G01B 11/12; G01B 11/14; G01B 11/24; G01B 11/2433
See application file for complete search history.

(56) References Cited

U.S. PATENT DOCUMENTS

| | | | | |
|---|---|---|---|---|
| 5,880,847 | A * | 3/1999 | Wakaoka | G01B 11/2408 356/613 |
| 7,120,288 | B2 * | 10/2006 | Fujishima | B23Q 17/22 348/94 |
| 2005/0208878 | A1 * | 9/2005 | Weiss | B24B 49/02 451/5 |
| 2008/0126041 | A1 * | 5/2008 | Maspoli | A61B 34/76 703/7 |
| 2011/0264406 | A1 * | 10/2011 | Calame | G01B 11/2433 702/155 |

* cited by examiner

*Primary Examiner* — Francis M Legasse, Jr.
(74) *Attorney, Agent, or Firm* — William W. Cochran; Cochran Freund & Young LLC

(57) ABSTRACT

Disclosed is a tool measuring device for measuring the size of tools used for making aluminum can bodies. The tool measuring device utilizes an LED measurement carriage having a central opening so that the LED measurement carriage passes over and around the tools. An LED linear beam is generated by LED linear arrays so that the tools cast a shadow on optical photodetector linear arrays. The distance between the transition points from light to dark on the optical photodetector linear arrays is measured to provide a highly accurate measurement of the size of various portions of the tools.

5 Claims, 35 Drawing Sheets

TOOL MEASURING APPARATUS FOR MOUNTING SURFACE TO CAST SHADOW

CROSS-REFERENCE TO RELATED APPLICATION

The present application claims the benefit of U.S. Provisional Application Ser. No. 61/905,524, filed Nov. 18, 2013, by Kalvis Jaunarajs, Michael W. Calahan and Kevin M. Gillest, entitled "Tool Measuring Apparatus," the disclosure of which is hereby incorporated herein by reference for all that it discloses and teaches.

BACKGROUND

The can making industry utilizes high technology techniques for making thin walled, two-piece aluminum cans. High precision tools are used, including punches and dies.

SUMMARY

An embodiment of the present invention may therefore comprise a measurement device for measuring tools for making aluminum can bodies comprising: a vibrational isolation plate that provides vibrational resistance and forms a mounting surface for the measurement device; base mount fixtures attached to the mounting surface; fixture mount rods attached to the base mount fixtures substantially parallel to the mounting surface; tooling fixtures attached to the fixture mount rods that support the tools in an elevated position above the mounting surface for measurement; a measurement carriage comprising: a carriage frame that forms a central opening; at least one light emitting diode linear array that is disposed on the carriage frame to emit a linear light beam that is projected across the central opening; at least one optical photodetector linear array that is disposed on the carriage frame to receive the linear light beam across the central opening; a rail that is disposed between the base mount fixtures; a rail guide coupled to the rail and to the carriage frame; a linear drive rail coupled to the rail guide that moves the rail guide and the carriage frame along the rail between the base mount fixtures so that the tools that are disposed in the tooling fixture in an elevated position above the mounting surface cast a shadow on the portions of the tools to be measured.

An embodiment of the present invention may further comprise a method of measuring tools for making aluminum can bodies comprising: attaching base mount fixtures to a mounting surface of a vibration resistant isolation plate with a predetermined spacing between the base mount fixtures; attaching fixture mount rods to the base mount fixtures so that the fixture mount rods are substantially parallel to the mounting surface; attaching tooling fixtures to the fixture mount rods to support the tools in an elevated position above the mounting surface; attaching a rail to the mounting surface between the base mount fixtures; attaching a rail guide to the rail; forming a measurement carriage comprising: forming a carriage frame that has a central opening; attaching at least one light emitting diode linear array to the carriage frame so that a linear light beam projects across the central opening; attaching at least one optical photodetector linear array to say carriage frame in a position to receive the linear light beam that is projected across the central opening; attaching the measurement carriage to the rail guide; moving the rail guide along the rail between the base mount fixtures so that the tools, that are supported in the elevated position in the tooling fixtures, pass through the central opening and cast a shadow of portions of the tools to be measured on the at least one optical photodetector linear array.

DETAILED DESCRIPTION OF THE EMBODIMENTS

Figure 1:
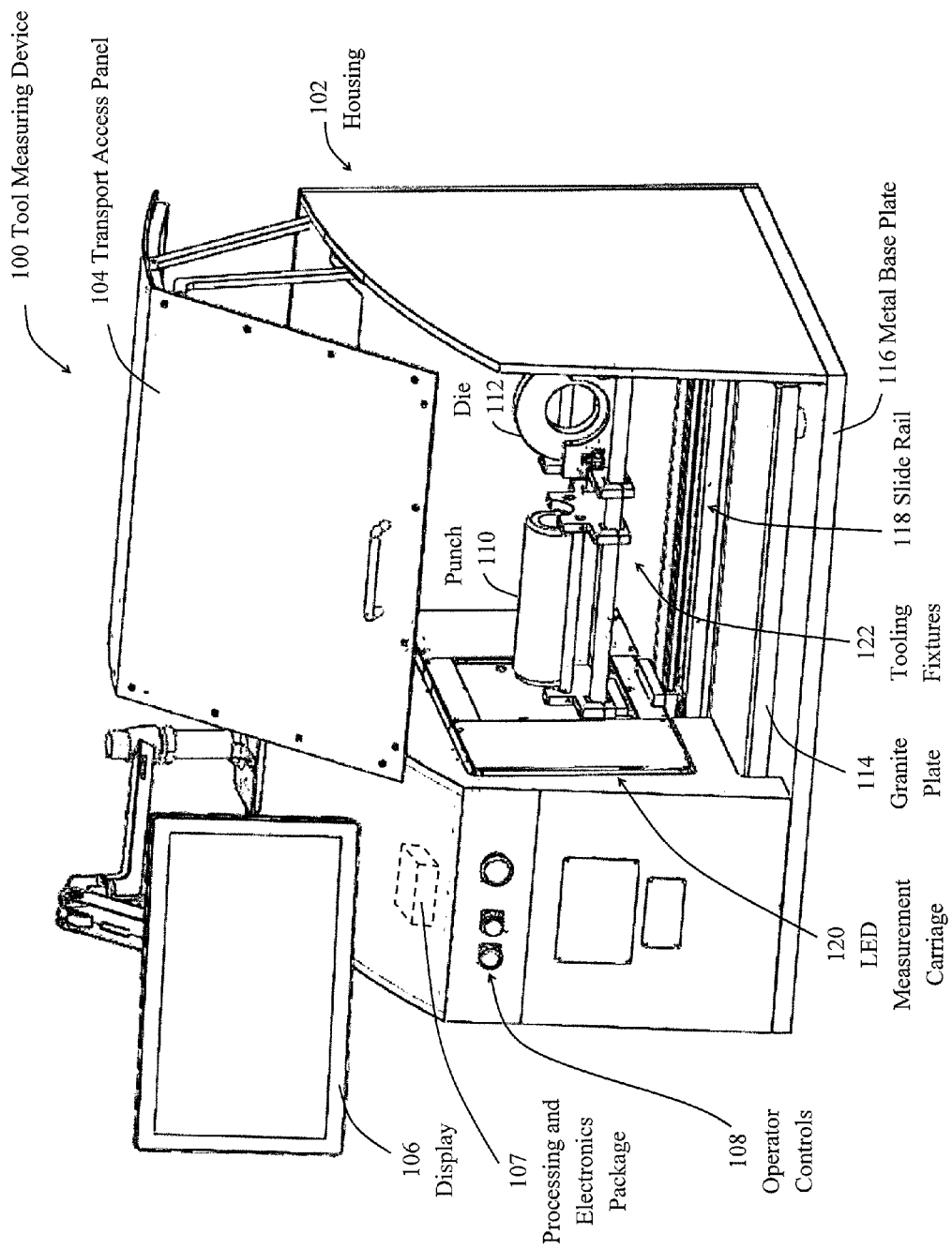
FIG. 1 is an isometric view of an embodiment of a tool measuring device.

FIG. 1 is an isometric view of the tool measuring device 100. As illustrated in FIG. 1, the tool measuring device 100 includes a housing 102 that provides a dust-free environment for measuring tools, such as punch 110 and die 112. Transparent access panel 104 provides an opening for accessing the interior portions of the tool measuring device 100, while providing a transparent cover for viewing the operation of the tool measuring device. Display 106 provides information regarding the measurements taken by the tool measuring device 100. Display 106 is connected to a processing and electronics package 107 that includes one or more logic processors (controllers) that read information provided by the LED measurement carriage 100 and generates display information relating to measurements of the tooling, such as punch 110 and die 112. Operator controls 108 allow an operator to easily operate the tool measuring device 100 by depressing start and stop buttons.

As also illustrated in FIG. 1, tools, such as punch 110 and die 112, are mounted on tooling fixtures 122. The LED measurement carriage 120 has a central opening which allows the LED measurement carriage to pass around the tooling, such as punch 110 and die 112 when LED measurement carriage 120 is moved on the slide rail 118. Slide rail 118 is mounted on a granite plate 114, which provides stability and isolation from surrounding vibrations. The granite plate 114 sits on the metal base plate 116. In some environments, the metal base plate 116 may be sitting on a surface that is subject to vibration. For example, in some instances, the tool measuring device 100 may be located in an area that is reasonably proximate to can making machinery, which causes vibrations. Granite plate 114 substantially isolates the tooling fixtures 122 from these vibrations, together with isolation pads, as disclosed in more detail below.

Figure 2:
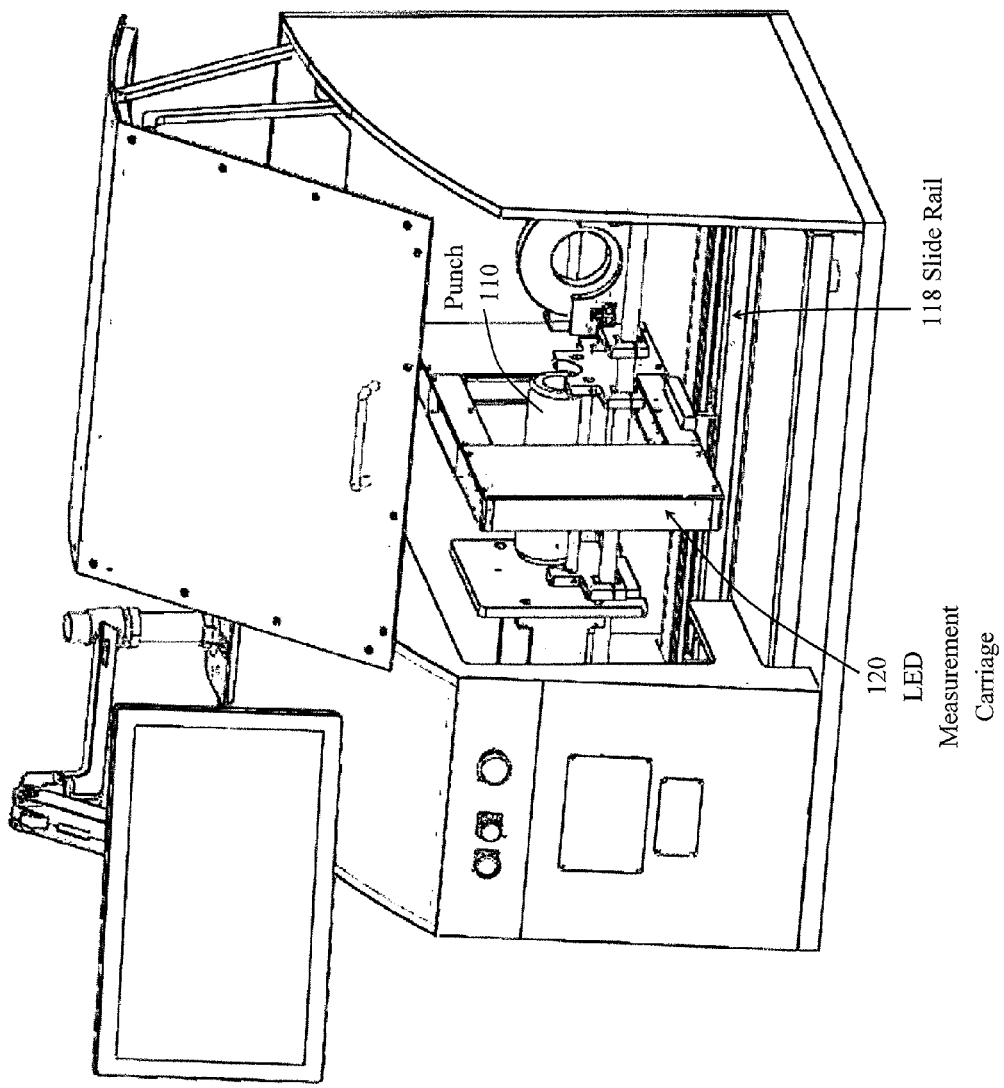
FIG. 2 is an isometric view of the tool measuring device of FIG. 1 in operation.

FIG. 2 is an isometric view of the embodiment of FIG. 1 with the LED measurement carriage 120 moved to a position for measuring the punch 110. The LED measurement carriage 120 is moved along the slide rail 118. The central opening in the LED measurement carriage 120 allows the LED measurement carriage 120 to pass around the punch 110. In this manner, the outer dimensions of the punch 110 can be measured by the LED measurement carriage 120.

Figure 3:
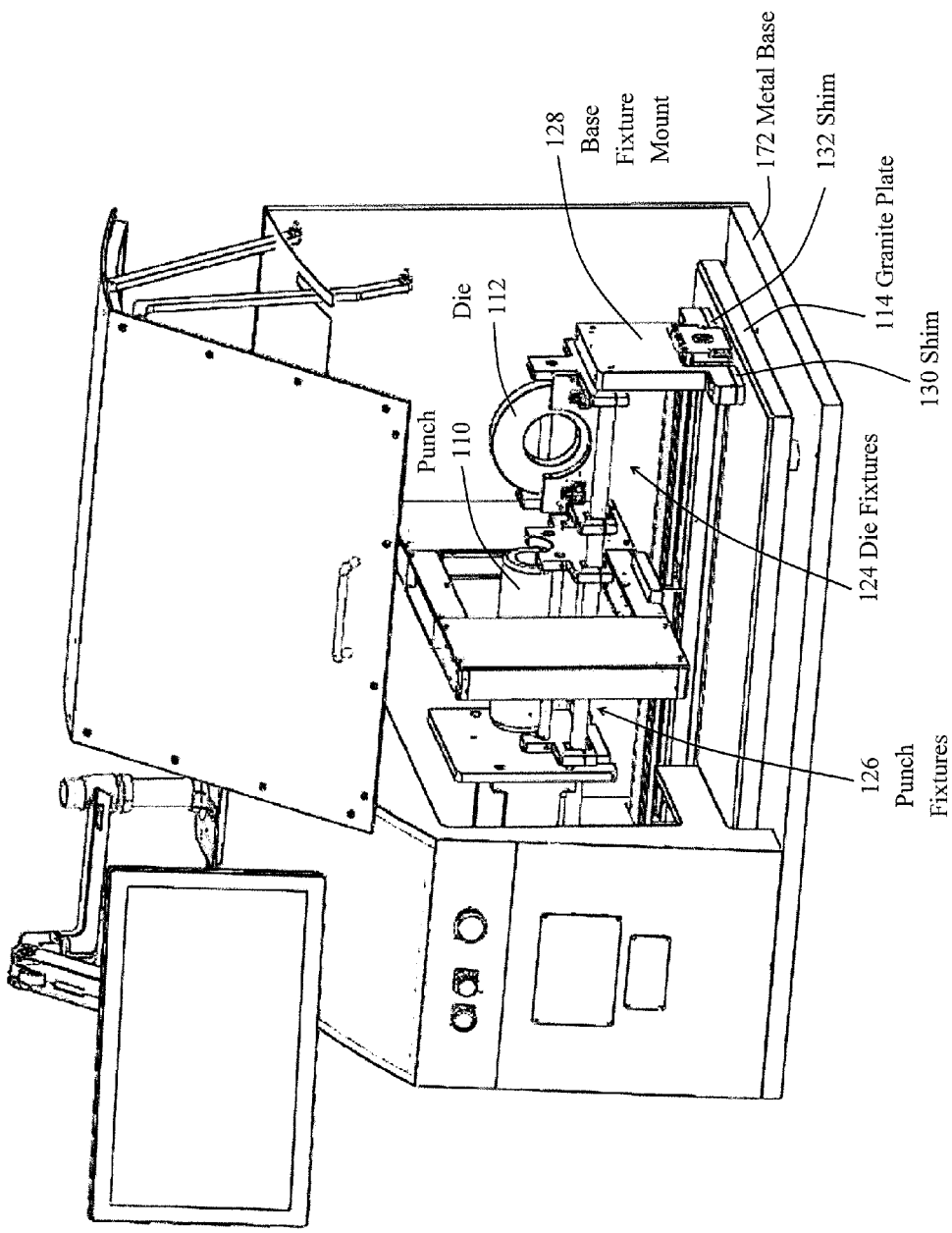
FIG. 3 is an isometric view of the embodiment of FIG. 1 of the tool measuring device with a side panel removed.

FIG. 3 is an isometric view of the embodiment of FIG. 2 with a side panel removed. As illustrated in FIG. 3, base fixture mount 128 is mounted on the granite plate 114 with shims 130, 132. Shims 130, 132 can provide precise spacing for the base fixture mount 128 on the granite plate 114, so that the punch fixtures 126 and the die fixtures 124 can be mounted substantially parallel to the surface of the granite plate 114 in tool measuring device 100. Metal base 172 provides a surface for mounting the granite plate 114 in tool measuring device 100. Punch fixtures 126 provide an accurate and very precise fixture for mounting the punch 110, while the die fixtures 124 provide an accurate and very precise fixture for mounting die 112. Accuracy and preciseness of these fixtures allows for precise measurements that have a precision that can be measured within several millionths of an inch. In this manner, very accurate measurements can be obtained for the tools, such as punch 110, die 112.

Figure 4:
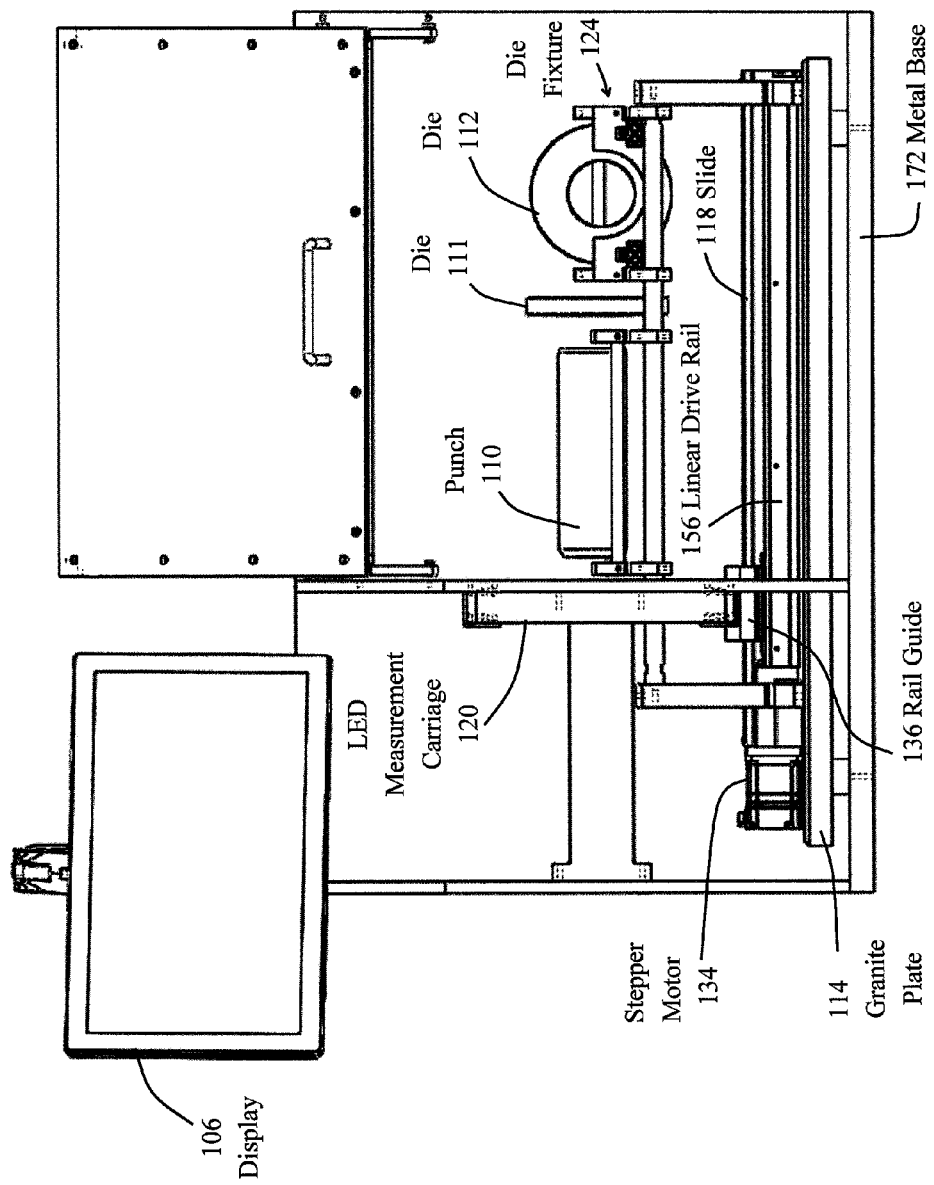
FIG. 4 is a side view of the tool measuring device of FIG. 1 with front panels removed.

FIG. 4 is a side view of the tool measuring device 100 illustrated in FIG. 1 with a number of panels removed. As illustrated in FIG. 4, metal base 172 provides the base for the tool measuring device 100. Granite plate 114 sits on the metal base 172 and is isolated from vibrations in the metal base 172 by isolation pads that are described in more detail below. The granite plate 114 sits on top of the metal base 172 and supports the stepper motor 134. The stepper motor is coupled to a linear drive rail 156, which drives the rail guide 136 that is connected to the LED measurement carriage 120. The stepper motor operates in response to control signals from the processing and electronics package 107 (FIG. 1) to move the LED measurement carriage 120 to specific locations with respect to the tools to be measured. In that regard, a series of measurements can be taken to create a profile of the outer surface of the punch 110 and the central opening in die 112. Die fixture 124 holds the die 112 in a position so that the inner ring can be measured by the LED measurement carriage. Similarly, the outer surface of die 111 can also be measured using the LED measurement carriage 120. The results of these measurements are then processed by the processing and electronics package 107 and displayed on display 106.

Figure 5:
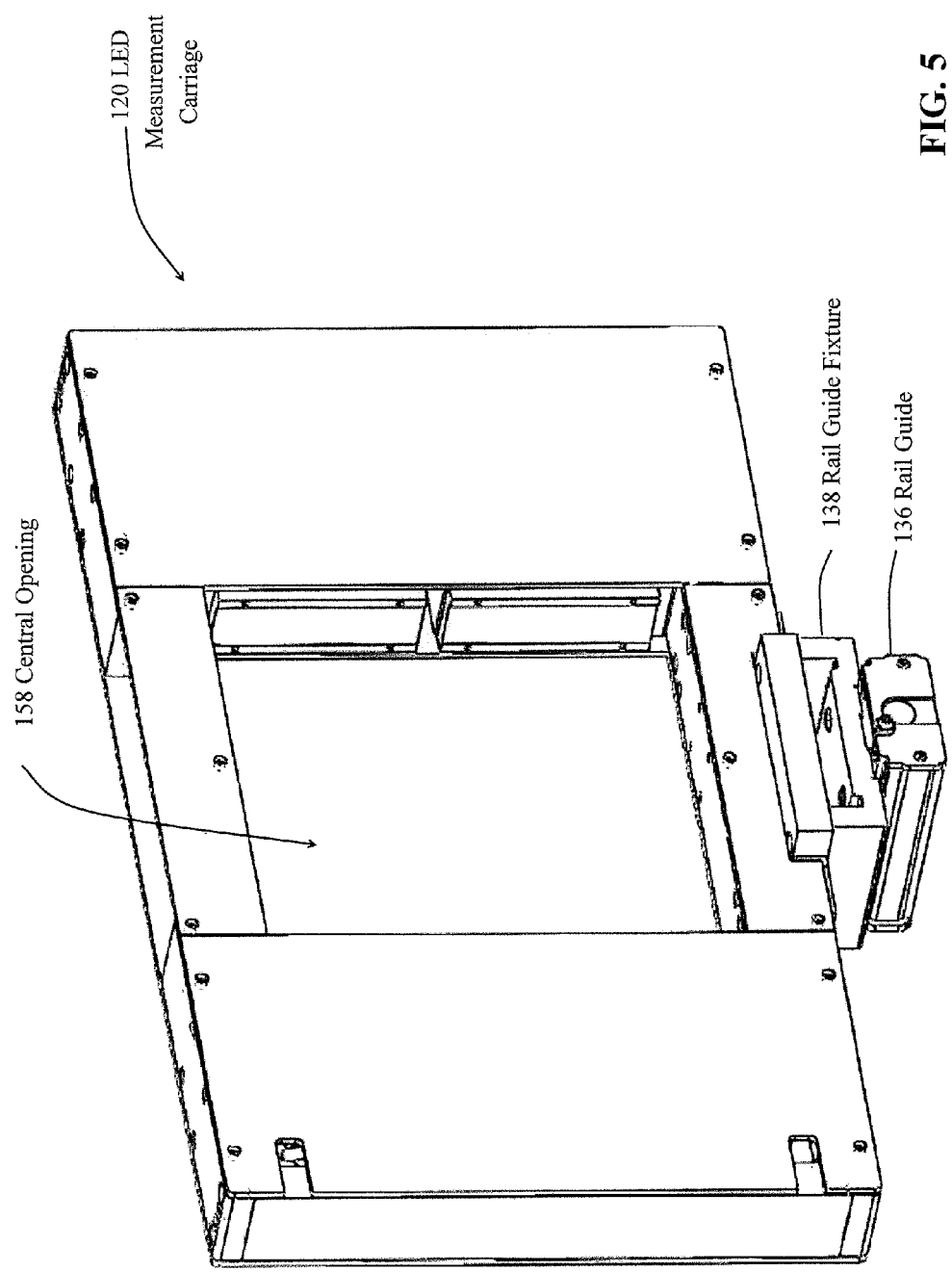
FIG. 5 is an isometric view of an embodiment of an LED measurement carriage.

FIG. 5 is an isometric view of the LED measurement carriage 120. The LED measurement carriage has a central opening 158, which passes around the tooling, such as punch 110, die 111, and die 112, as illustrated in FIG. 4. The LED measurement carriage 120 is connected to a rail guide fixture 138, which is, in turn, connected to the rail guide 136, which guides the rail guide fixture 138 and the LED measurement carriage 120 on the slide rail 118 (FIG. 4).

Figure 6:
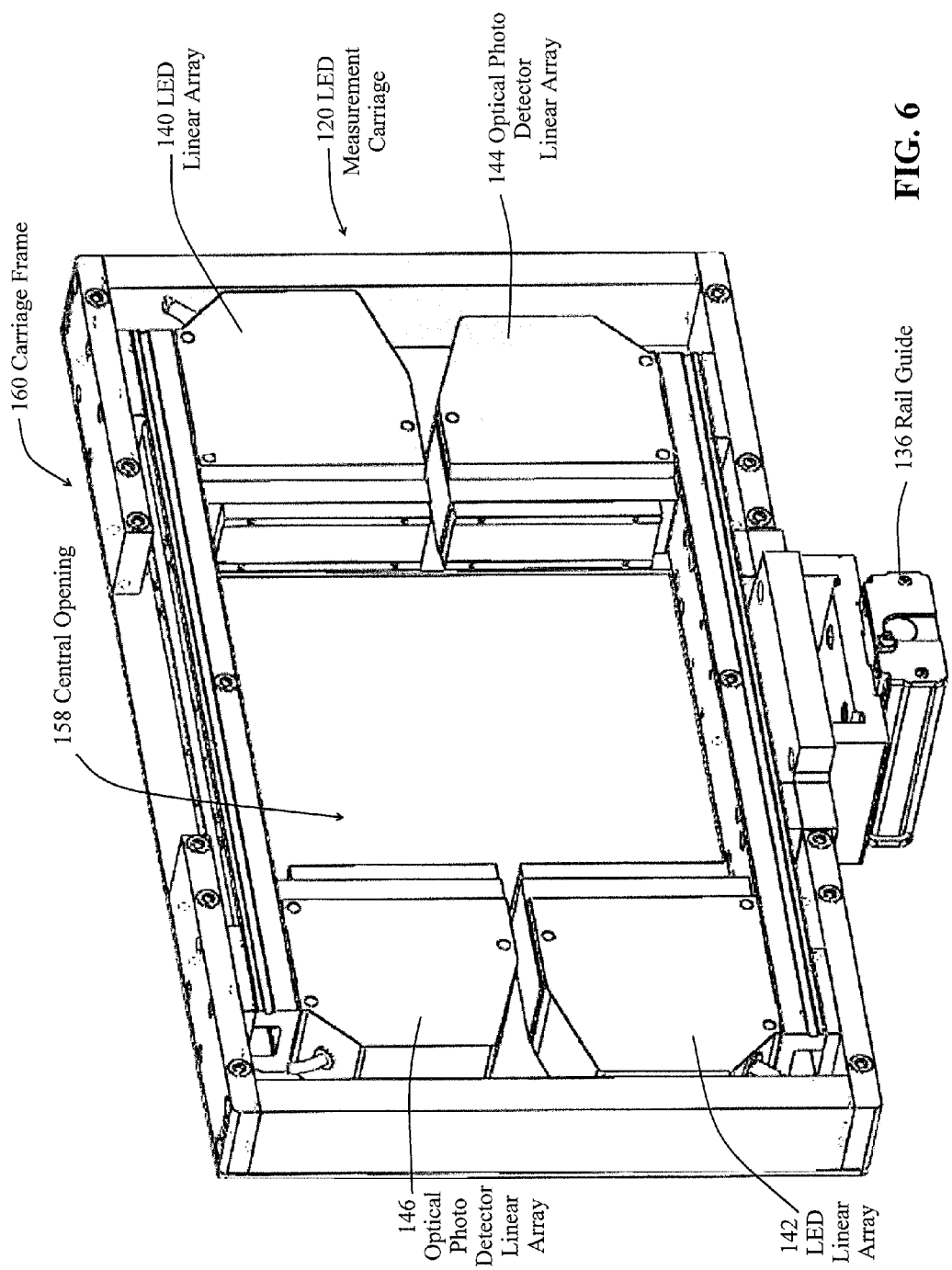
FIG. 6 is an isometric view of the embodiment of the LED measurement carriage of FIG. 5 with panels.

FIG. 6 is an isometric view of the embodiment of FIG. 5 illustrating the LED measurement carriage 120 with panels removed. As illustrated in FIG. 6, the LED measurement carriage 120 is constructed from a carriage frame 160 that creates a central opening 158. Connected to the carriage frame 160 is an LED linear array 140, which projects a line of LED illumination onto the optical photodetector linear array 146. Similarly, LED linear array 142 projects a line of LED illumination onto the optical photodetector linear array 144. The tools, such as punch 110, die 111 and die 112, project a shadow onto the optical photodetector linear array 144 and optical photodetector linear array 146. The transition point between the dark and the light illumination on the optical photodetector linear array 144 and optical photodetector linear array 146 provides information regarding the transition between the shadow of the tool and the non-obstructed light from the LED linear arrays 140, 142. These transition points are used to calculate a distance that corresponds to the size of the tool or the opening in the tool that is being measured. The distance between the transition points can be calibrated using a highly precise precalibrated tool. The carriage frame 160 is constructed with precision to be square, so that the LED linear arrays 140, 142 project an optical beam that is substantially parallel to the top and bottom surfaces of the carriage frame 160. Rail guide 136 guides the carriage frame along the slide rail 118 (FIG. 4) along the distance of the tools, such as punch 110, die 111 and die 112, in a substantially parallel manner.

Figure 7:
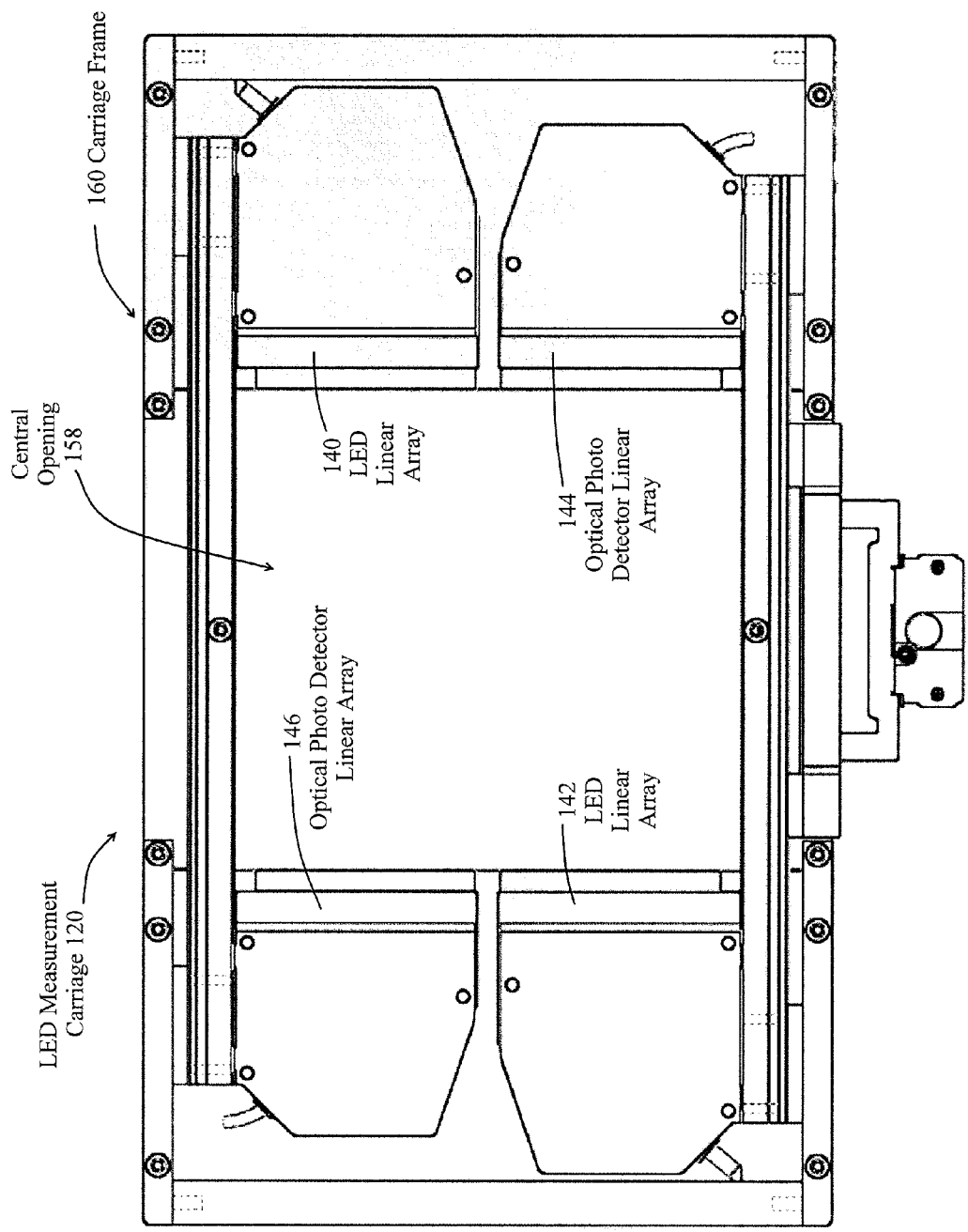
FIG. 7 is a side view of the LED measurement carriage with panels removed.

FIG. 7 is a side view of the LED measurement carriage 120 with panels removed. As illustrated in FIG. 7, the carriage frame forms a central opening 158 that passes over and around the tools, such as punch 110, die 111 and die 112.

Optical photodetector linear array 146 is aligned with the LED linear array 140. Similarly, the optical photodetector linear array 144 is aligned with the LED linear array 142. Each of these arrays are connected to the carriage frame 160.

Figure 8:
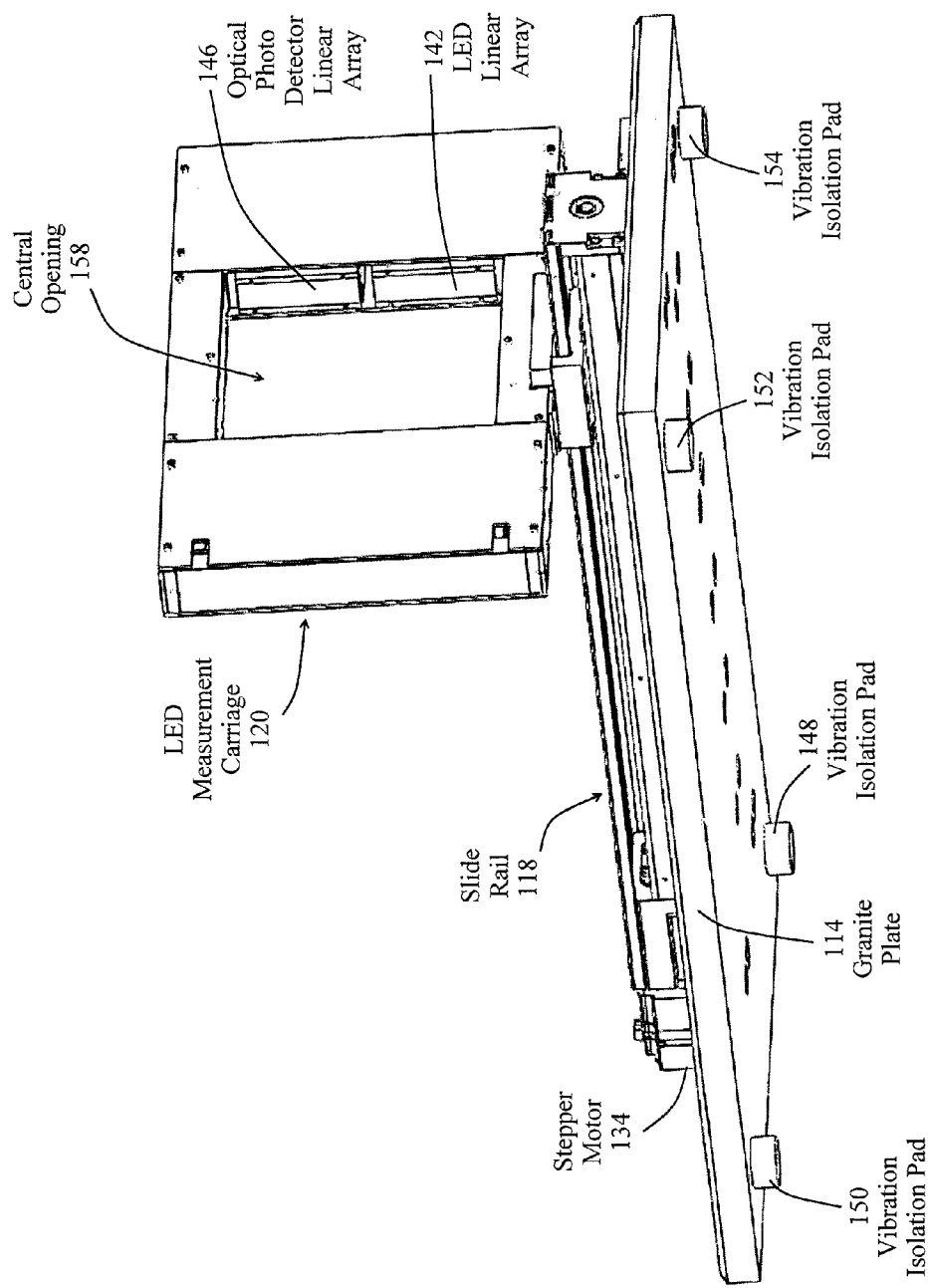
FIG. 8 is an isometric view of the LED measurement carriage mounted on a slide rail, which is mounted on a granite plate.

FIG. 8 is an isometric view of the LED measurement carriage 120 that is mounted on the slide rail, which is in turn mounted on the granite plate 114. As illustrated in FIG. 8, optical photodetector linear array 146 is mounted in the LED measurement carriage 120 to receive a linear array of light from the LED linear array 140 (FIG. 7). Similarly, LED linear array 142 projects a linear array of LED light across the central opening 158, which is received by the optical photodetector linear array 144 (FIG. 7). The LED measurement carriage 120 moves along the slide rail 118 in response to movement generated by stepper motor 134, as explained in more detail below. Small precise movements of the LED measurement carriage 122 can be created by the stepper motor 134.

As also illustrated in FIG. 8, the granite plate is mounted on vibrational isolation pads 148, 150, 152, 154. The vibrational isolation pads 150-154 provide isolation between the metal base plate 116 (FIG. 1) and the granite plate 114. Granite plate 114 is sufficiently thick and sufficiently heavy to minimize the effect of vibrations from the metal base plate 116, which allows the vibrational isolation pads 148, 152 to absorb a substantial portion of the vibrations that are transmitted by the metal base plate 116. Vibrational isolation pads 148, 150, 152 may be constructed of a material that flexes in response to the vibrations transmitted by the metal base plate 116. For example, a rubber or plastic material may be selected for the vibrational isolation pads 148-152 that has an optimal density for absorbing the frequency and magnitude of the vibrations created by surrounding equipment.

Figure 9:
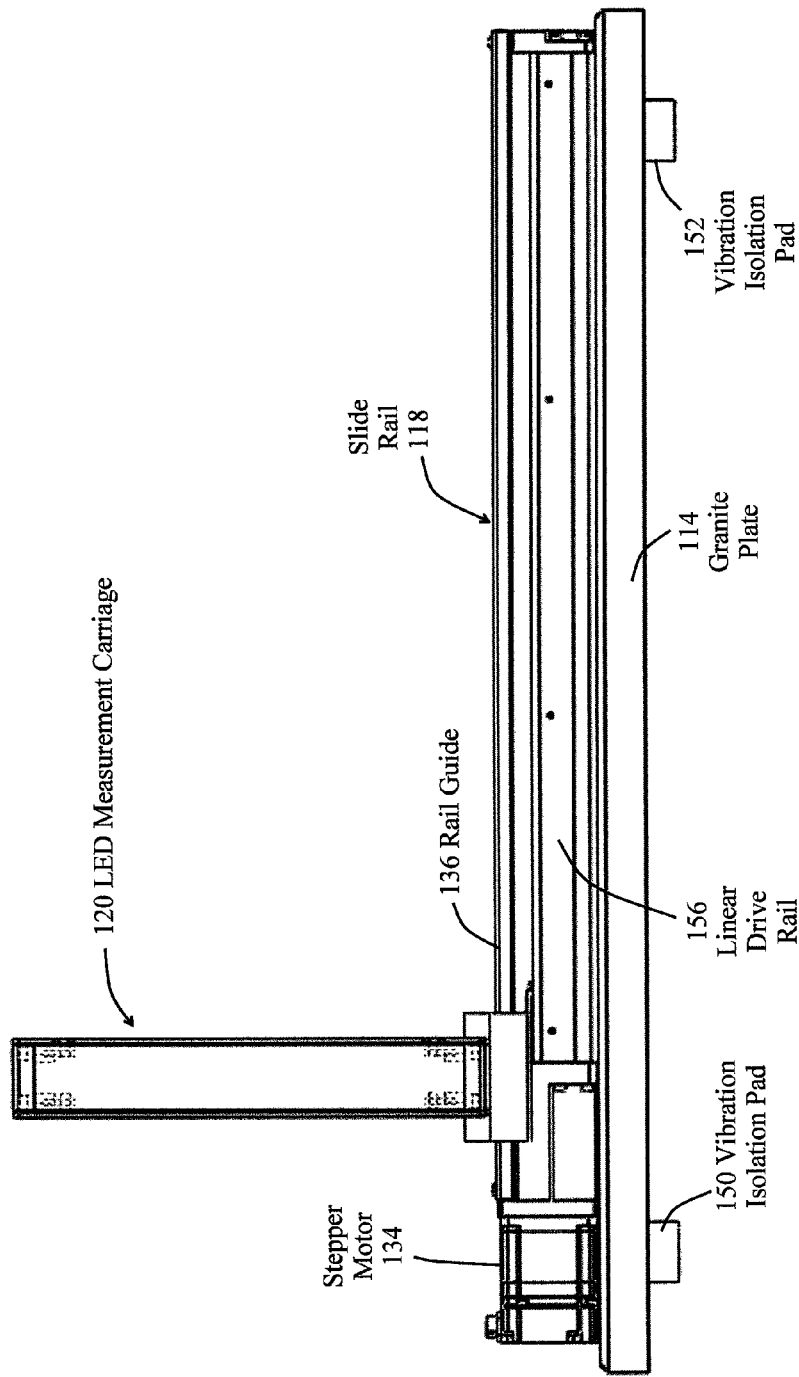
FIG. 9 is a side view of the embodiment of FIG. 8.

FIG. 9 is a side view of the embodiment of FIG. 8. As illustrated in FIG. 9, the LED measurement carriage 120 is mounted on the rail guide 136. The rail guide 136 is mounted on the slide rail 118. Stepper motor 136 drives the linear drive rail 156 to move the rail guide 136 and the LED measurement carriage 120 along the slide rail 118. Vibrational isolation pads 150, 152 are mounted on the bottom surface of the granite plate 114. Although granite plate 114 is indicated as being constructed from granite, any suitable stone material, or other heavy and dense material, can be used as the mounting surface for the linear drive rail 156, slide rail 118 and stepper motor 134. As shown in FIG. 9, the LED measurement carriage 120 is located in an initial start position prior to scanning the tools that are to be measured.

Figure 10:
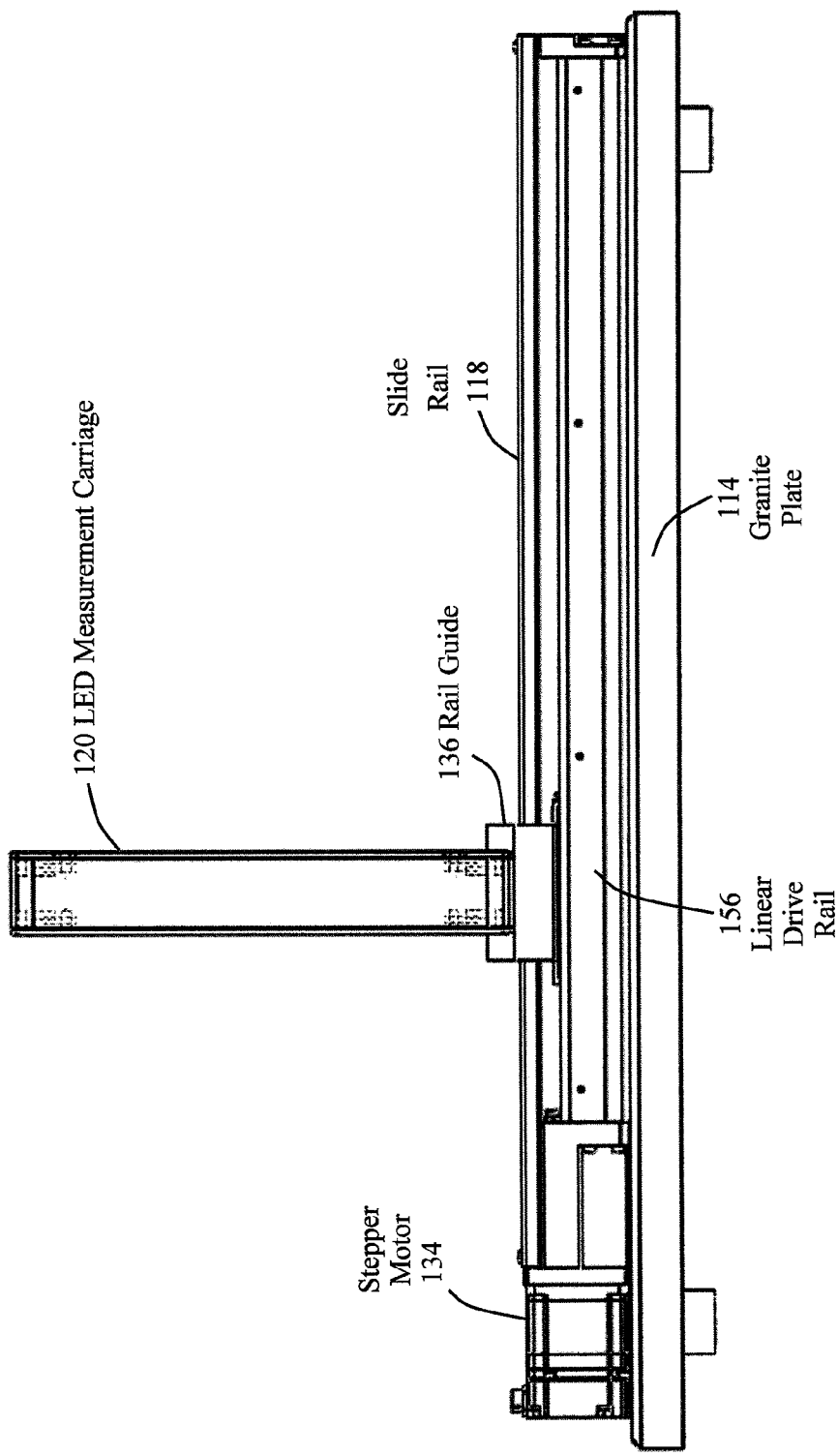
FIG. 10 is a side view of the embodiment of FIG. 9 with the LED measurement carriage moved to a second position.

FIG. 10 is a side view of the embodiment of FIG. 9 with the LED measurement carriage 120 moved to a second position. Stepper motor 134 rotates in small steps in response to control signals from the processing and electronics package 107 (FIG. 1) to drive the linear drive rail 156. LED measurement carriage 120 moves in very small steps along the surface of the slide rail 118. The processing and electronics package 107 reads measurements of the tool as the LED measurement carriage 120 moves along the slide rail 118. The processing and electronics package 107 is programmed to record measurements at specific locations along the tool. For example, an initial reading of the punch 110 can be taken to locate the end of the punch 110, which is used as a starting point for the measurements for the punch 110. Subsequent measurements of the punch 110 can then be referenced to the end of the punch. The desired number of measurements can then be taken along the length of the punch at the desired locations on the punch and recorded for display and generation of a profile of the outer surface of the punch. In that regard, measurements can be taken and recorded at each step of the movement of the LED measurement carriage 120, or measurements may be taken at spaced locations, such as every 5, 10, 20 steps or more of the stepper motor 134. Further, measurements may be taken at greater frequency during the measurement of transitional portions of the punch to create a very accurate profile of the transitional surface of a punch that indicate the curvature and slope of these transitions. All of this information is highly important in determining whether a punch has been properly milled for operation in an aluminum body fabrication plant.

Figure 11:
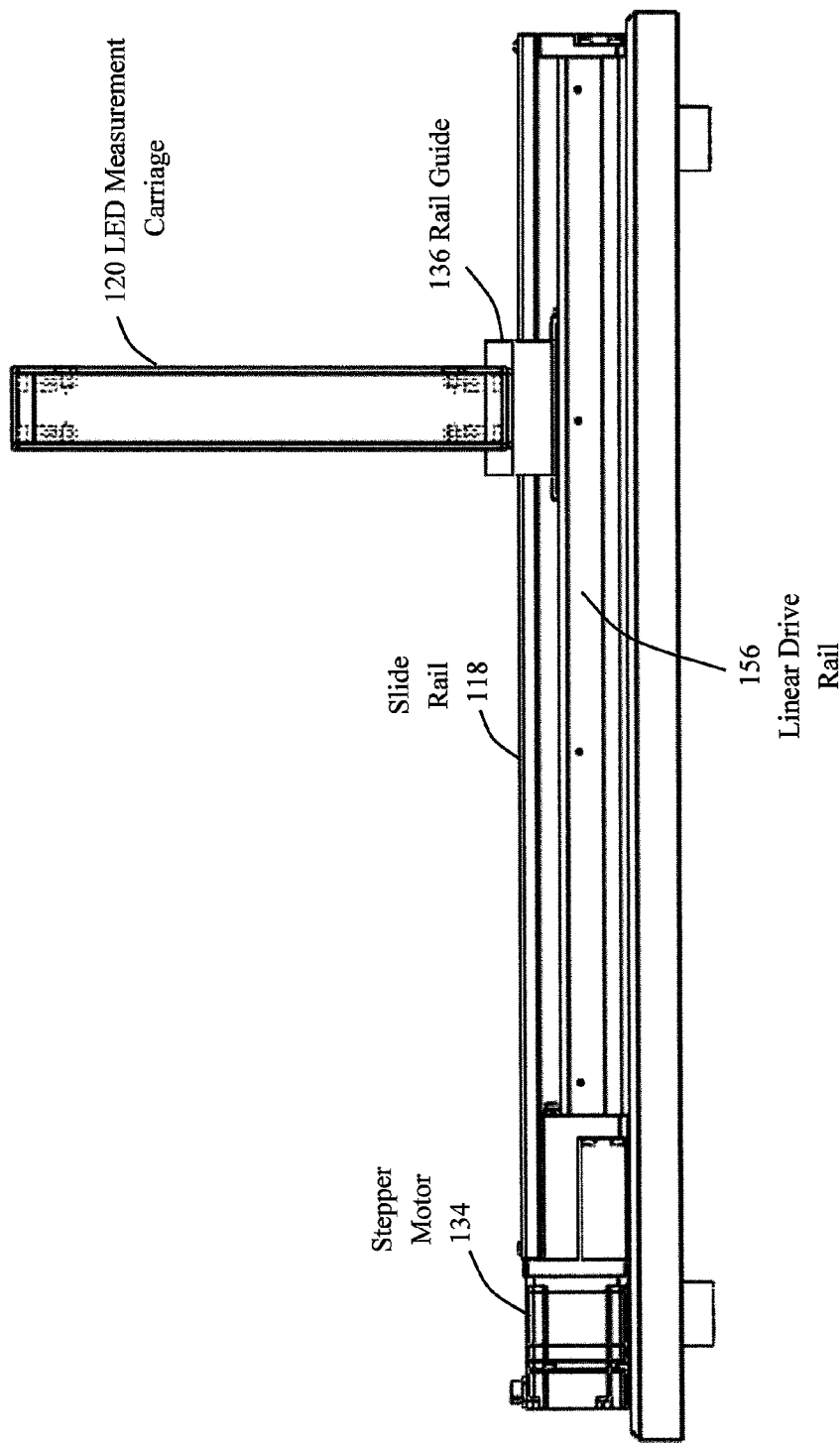
FIG. 11 is a side view of the embodiment of FIG. 9 with the LED measurement carriage in a third position.

FIG. 11 is a side view of the embodiments of FIGS. 9 and 10 illustrating the LED measurement carriage 120 moved to a third position. Again, the stepper motor 134 drives the rail guide 136 and the attached LED measurement carriage 120 along the slide rail 118 in very precise, small steps using the linear drive rail 156. The dies 111, 112 can therefore be accurately measured with respect to the inner openings and the outer surface of the dies. Maximum values can be calculated and displayed using standard comparison techniques for comparing the data to obtain a measurement value.

Figure 12:
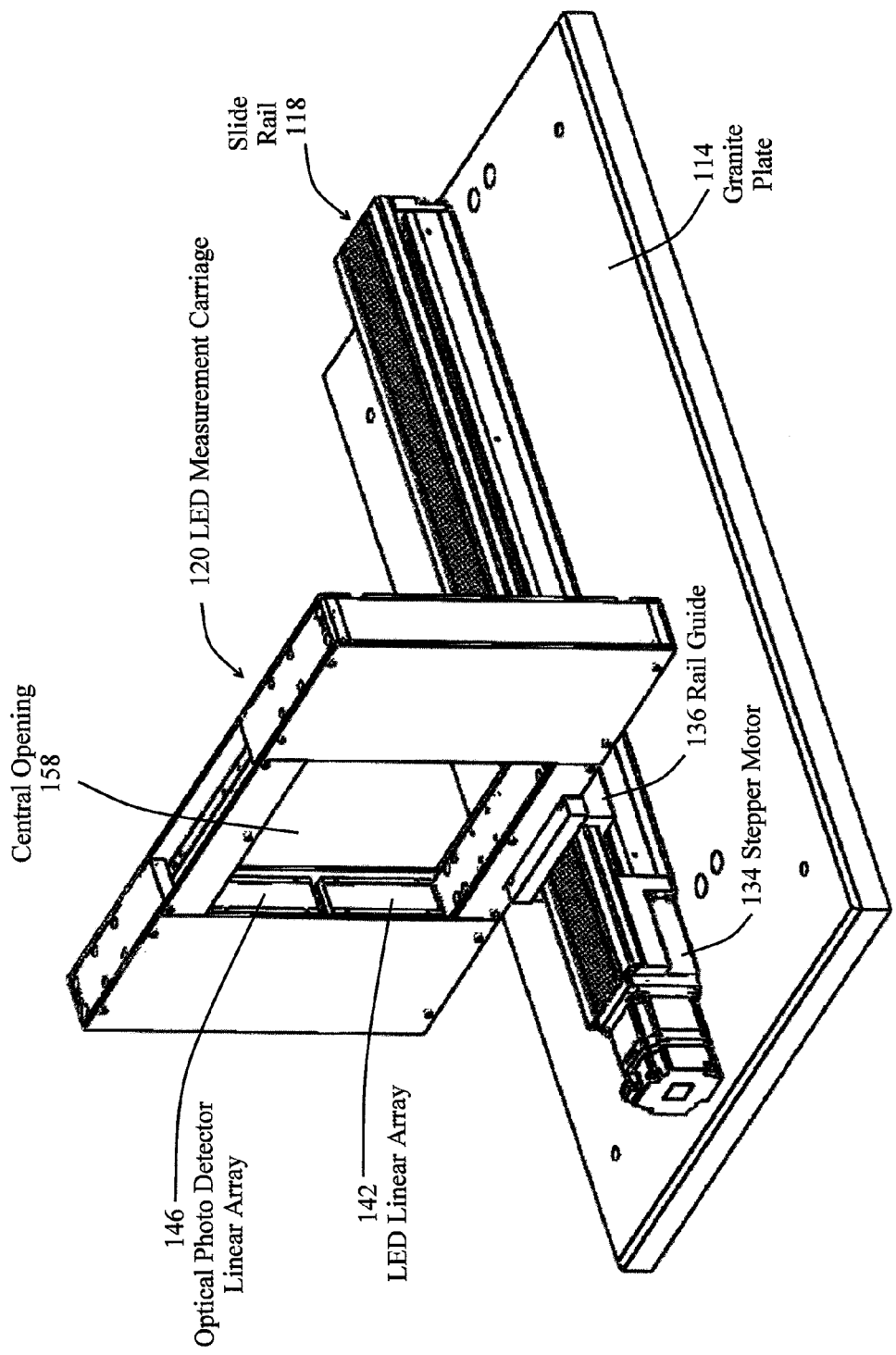
FIG. 12 is an isometric view of the embodiment of FIG. 9.

FIG. 12 is an isometric view of the embodiments of FIGS. 9, 10 and 11. As illustrated in FIG. 12, the LED measurement carriage 120 is mounted on the rail guide 136. Rail guide 136 moves along the slide rail 118 in response to rotation of the stepper motor 134, which drives the rail guide 136. LED linear array 142 projects a linear light beam across the central opening 158 in the LED measurement carriage 120. Optical photodetector linear array 146 detects the linear optical beam projected across the central opening 158 from LED linear array 140. The mechanism illustrated in FIG. 12 is mounted on the granite plate 114, which minimizes vibration in the manner indicated above.

Figure 13:
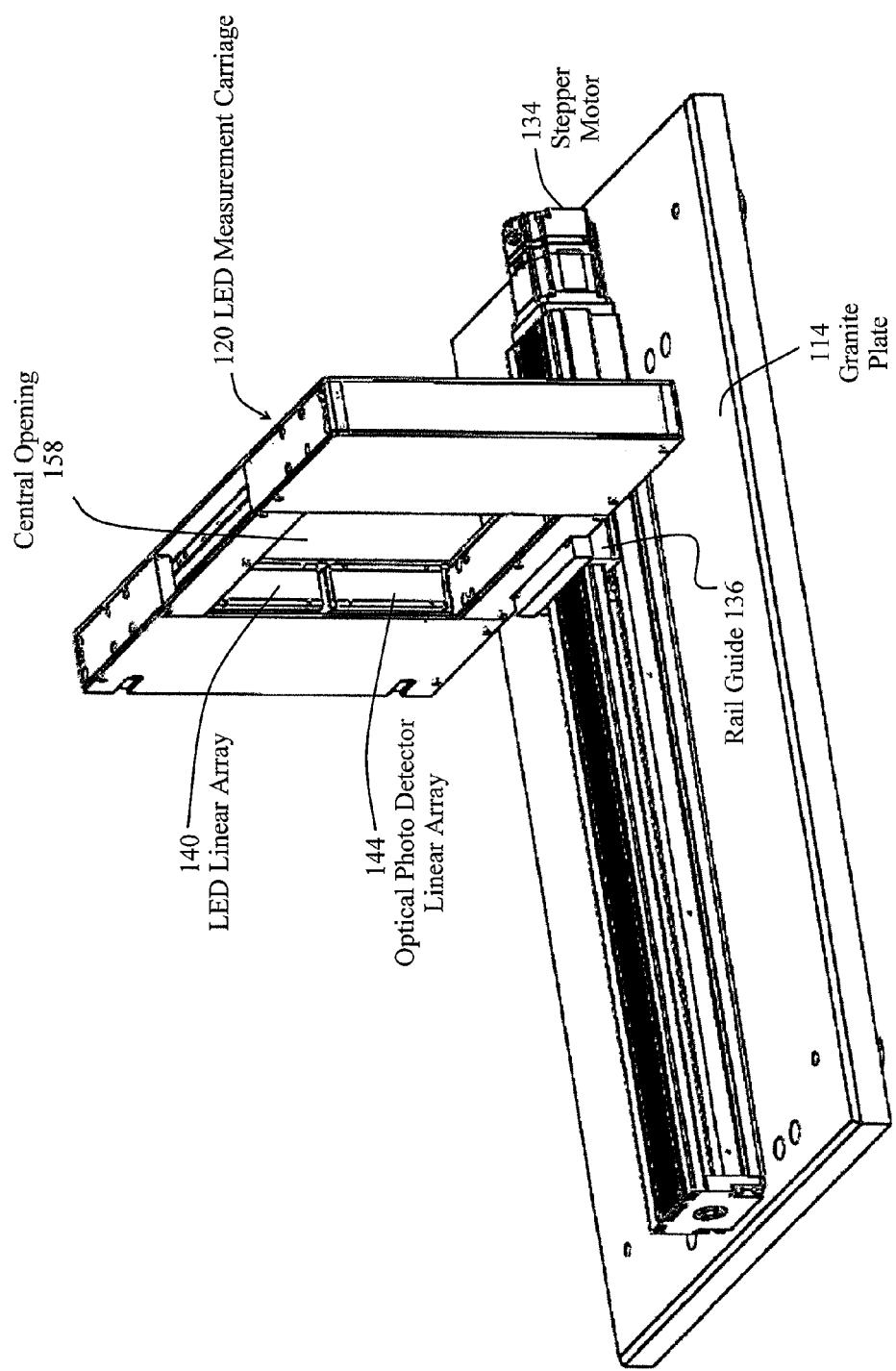
FIG. 13 is an opposite isometric view of the embodiment of FIG. 12.

FIG. 13 is an opposite perspective view of the embodiment illustrated in FIG. 12. As shown in FIG. 13, the LED measurement carriage 120 includes LED linear array 140, which projects a linear optical beam across the central opening 158 of the LED measurement carriage 120. The optical beam is detected by optical photodetector linear array 146 (FIG. 12). Optical photodetector linear array 144 detects the linear optical beam generated by LED linear array 140 (FIG. 12) that is projected across the central opening 158. The LED measurement carriage 120 slides along the guide rail 136 in response to small rotational steps of the stepper motor 134. The mechanism of FIG. 13 is mounted on the granite plate 114.

Figure 14:
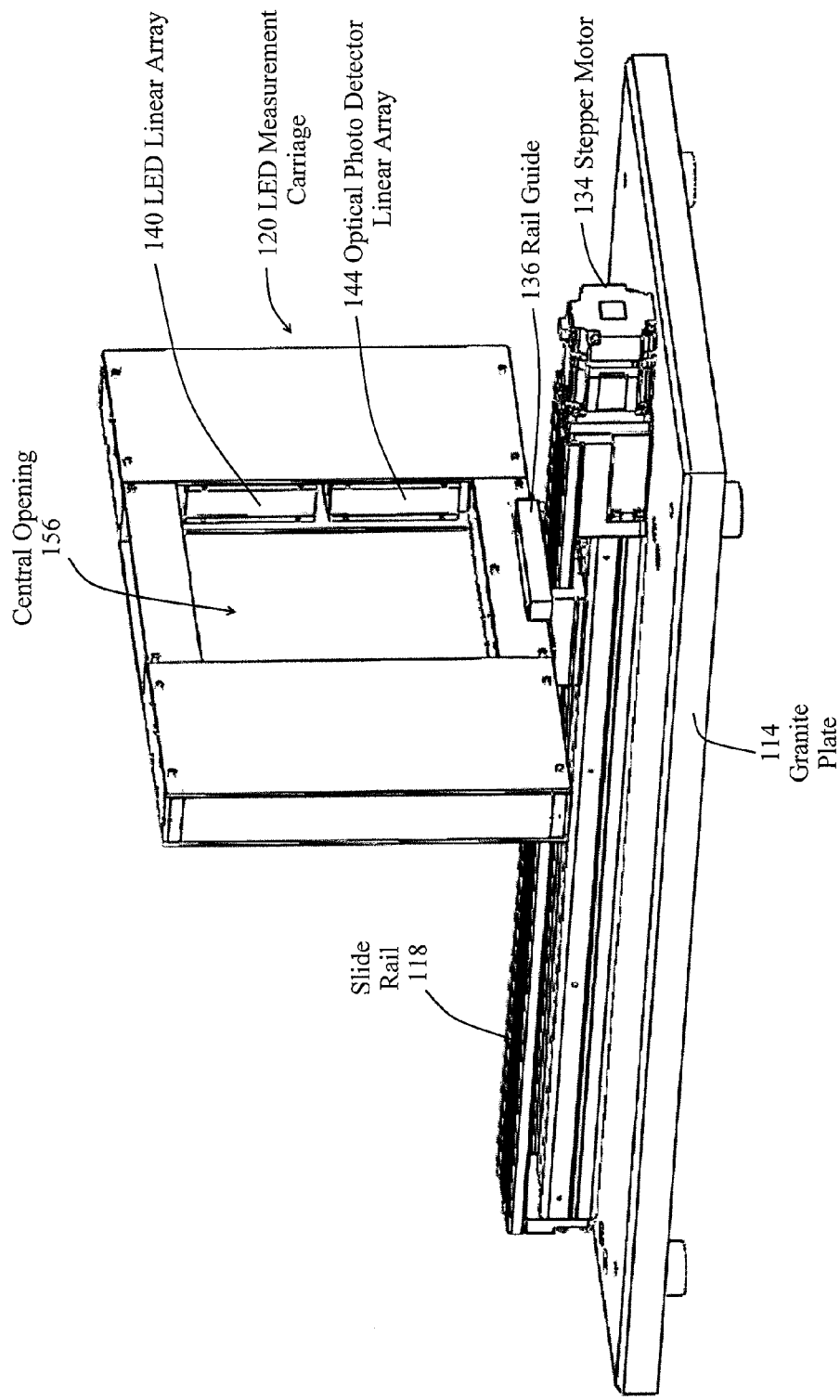
FIG. 14 is another isometric view of the embodiment of FIG. 9.

FIG. 14 is another perspective view of the embodiment of FIG. 13. As shown in FIG. 14, the LED measurement carriage 120 includes the LED linear array 140 and the optical photodetector linear array 144. Rail guide 136 guides the LED measurement carriage 120 alone the slide rail 118 in response to small rotational steps generated by stepper motor 134. The mechanism illustrated in FIG. 14 is mounted on the granite plate 114 to reduce vibrations.

Figure 15:
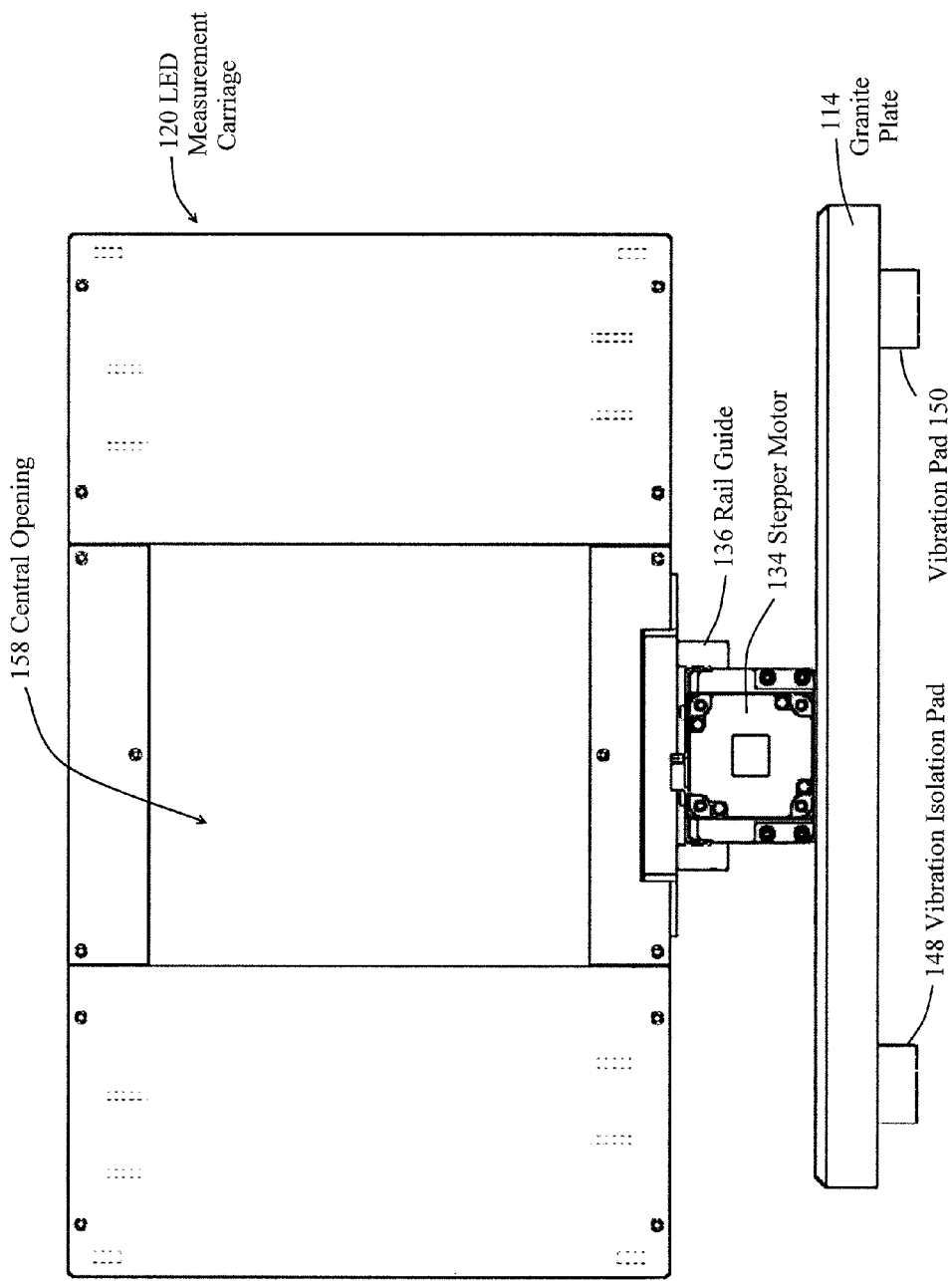
FIG. 15 is an end view of the embodiment of FIG. 9.

FIG. 15 is an end view of the embodiment of FIG. 14. As illustrated in FIG. 15, the LED measurement carriage 120 has a central opening 158. The LED measurement carriage is connected to the rail guide 136, which is driven by the stepper motor 134. Central opening 158 allows the measurement carriage 120 to pass over and around the tools to be measured, so that the tools to be measured cast a shadow on the optical photodetector linear arrays 144, 146. In this manner, measurements of the sizes of the various tools can be made by determining the distance between the transition points between light and dark on the photodetector linear arrays 144, 146. The mechanism illustrated in FIG. 15 is mounted on the granite plate 114. Vibrational isolation pads 148, 150 reduce the transmission of vibrations to the LED measurement carriage 120 created by outside sources.

Figure 16:
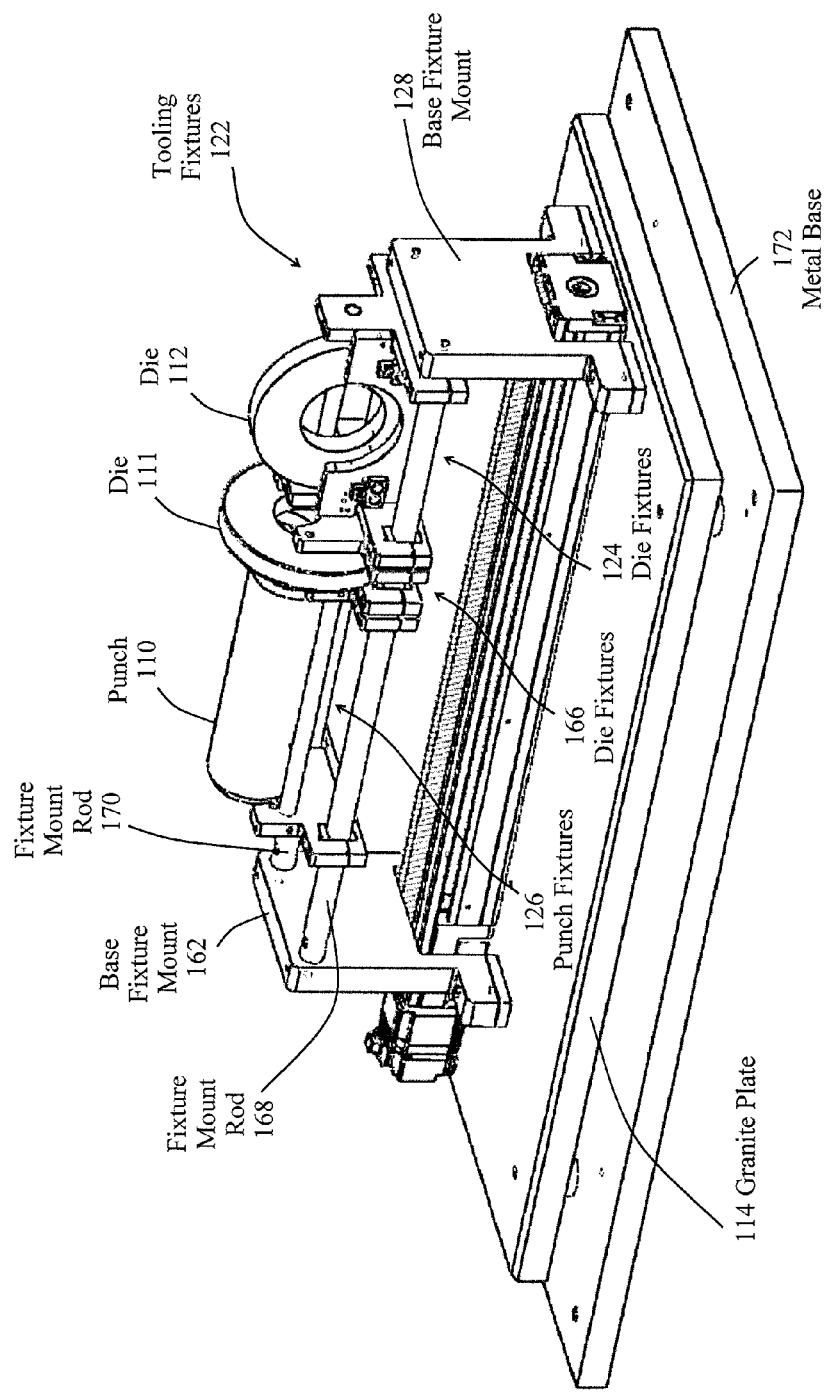
FIG. 16 is an isometric view illustrating portions of the fixtures of the tool measuring device of the embodiment of FIG. 1.

FIG. 16 is an isometric view of various portions of the tooling fixtures 122 that are mounted on the granite plate 114 and metal base 172. As illustrated in FIG. 16, tooling fixtures 122 includes a base fixture mount 128 and a base fixture mount 162 that are connected to fixture mount rods 168, 170. Fixture mount rods 168, 170 support the punch fixtures 126, the die fixtures 166 and die fixtures 124. Punch fixtures 126 support the punch 110 in a precise location. Die fixtures 166 locate die 164 in a precise position on the tooling fixtures 122. Die fixtures locate die 112 in a precise position on the tooling fixtures 122.

Figure 17:
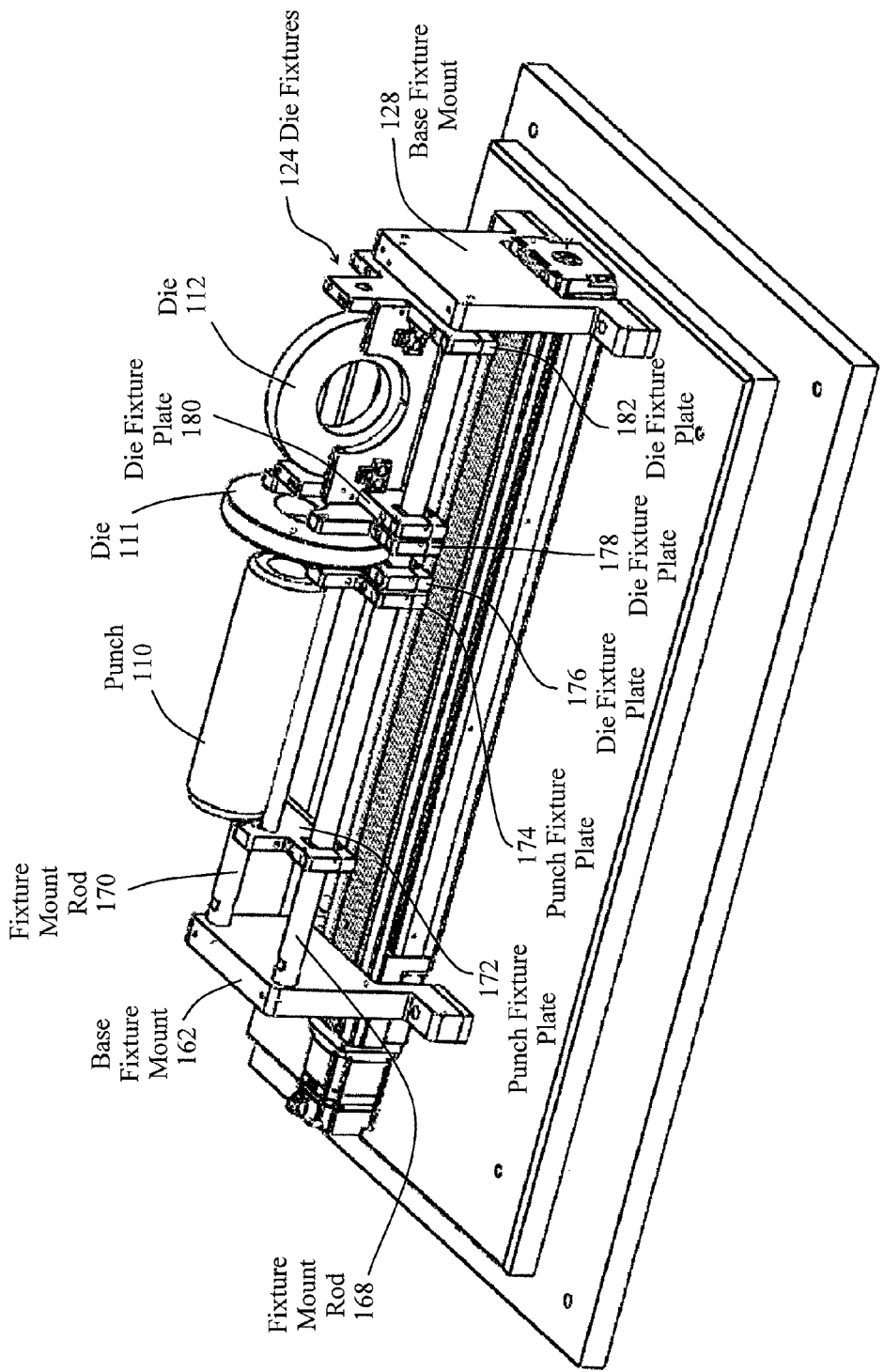
FIG. 17 is another isometric view of the embodiment of FIG. 16.

FIG. 17 is another isometric view of the embodiment of FIG. 16. As shown in FIG. 17, base fixture mounts 128, 162 support the fixture mount rods 168, 170. Punch fixture plates 172, 174 are clamped to the fixture mount rods 168, 170. Similarly, die fixture plates 176, 178 are also clamped to the fixture mount rods 168, 170. Fixture die plates 176, 178 support die 111. Die fixture plates 180, 182 form a portion of the die fixture 124 that supports die 112.

Figure 18:
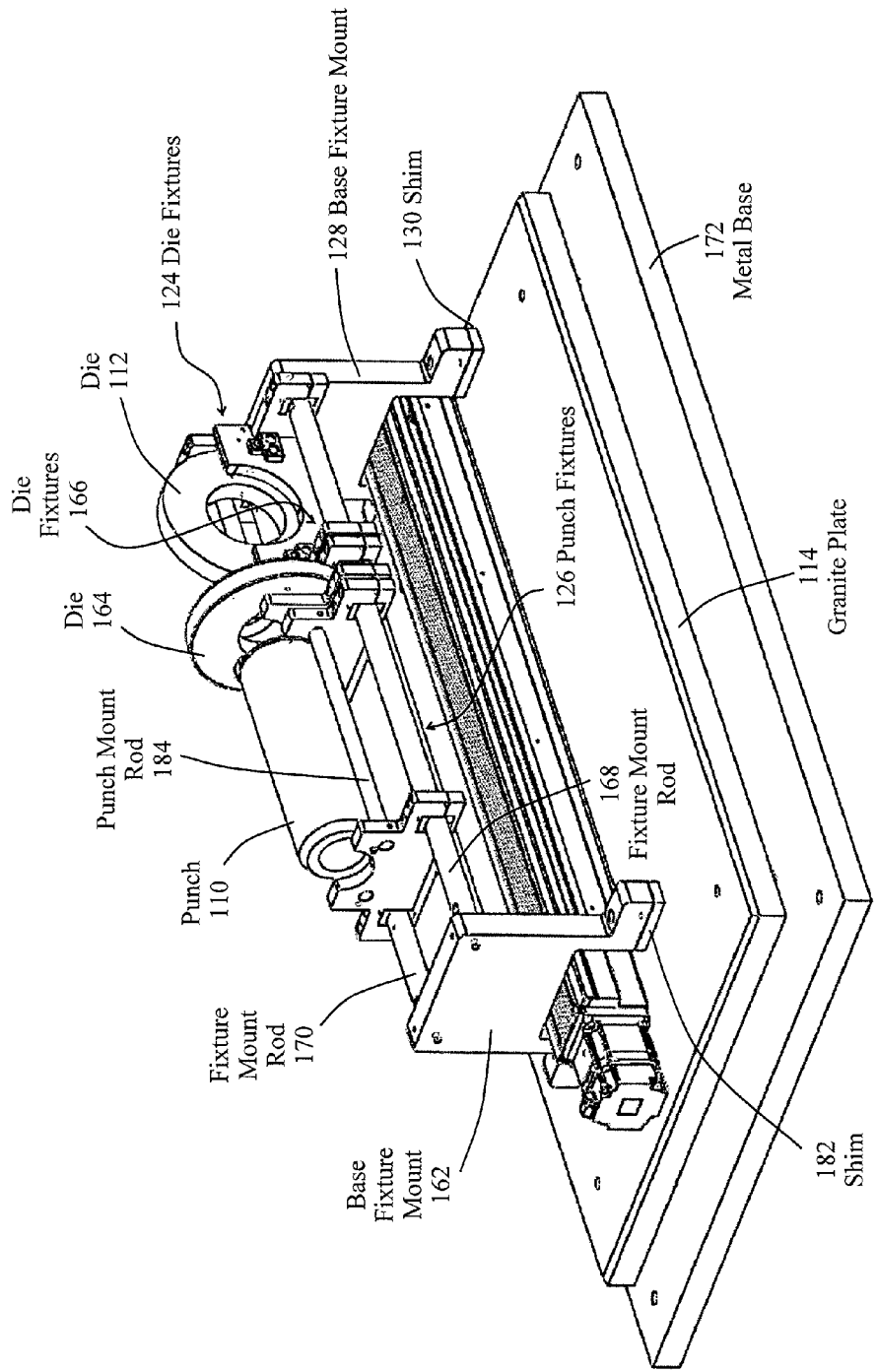
FIG. 18 is another isometric view of the embodiment of FIG. 16.

FIG. 18 is an isometric view of the embodiment of FIG. 17. As shown in FIG. 18, base fixture mount 162 is mounted to the granite plate 114 with a shim 182 to level the fixture mount rods 168, 170. Similarly, base fixture mount 128 is mounted to the granite plate 114 using shim 130. Again, the granite plate 114 sits on the metal base 172. Fixture mount rods 168, 170 are attached to the base fixture mounts 128, 162, which support the various fixture plates. In that regard, punch fixture plate 172 is clamped to the fixture mount rods 168, 170. Punch mount rod 184, and a similar punch mount rod 210 (FIG. 33), form a cradle that support the punch 110. Punch 110 is supported by punch fixtures 126. Die 164 is supported by die fixtures 166. Die 112 is supported by die fixtures 124.

Figure 19:
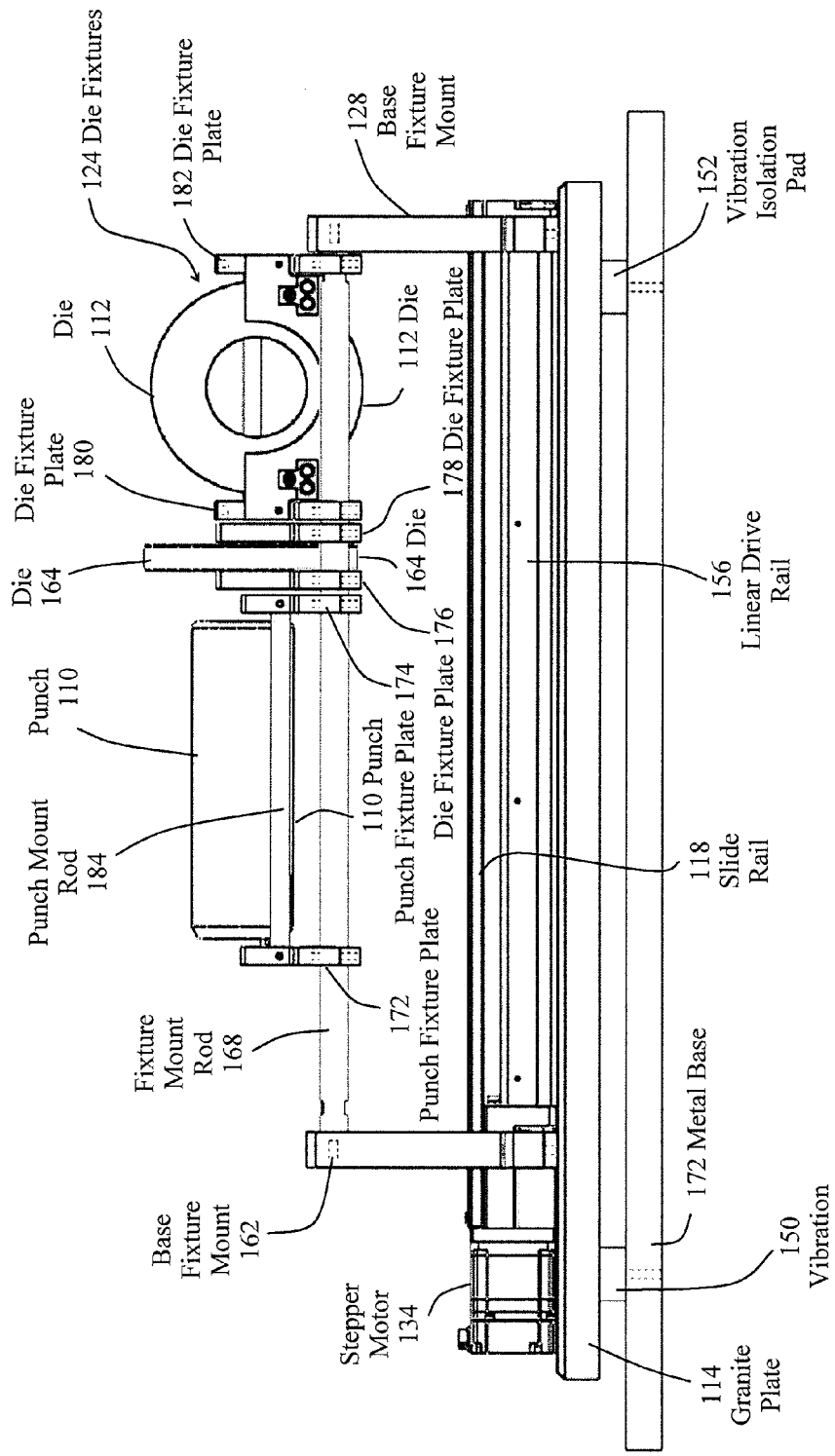
FIG. 19 is a side view of the embodiment of FIG. 16.

FIG. 19 is a side view of the embodiment of FIG. 18. Granite plate 114 is supported by vibrational isolation pads 150, 152, which are mounted on the metal base 172. Stepper motor 134 is coupled to the linear drive rail 156 to drive the LED measurement carriage 120 (FIG. 9) along the slide rail 118. Base fixture mounts 128, 162 support the fixture mount rod 168 and fixture mount rod 170 (FIG. 18). Fixture punch plates 172, 174 are clamped to the fixture mount rods 168, 170. Punch mount rod 184 and punch mount rod 210 (FIG. 33) form a cradle to support the punch 110. As illustrated in FIG. 19, the cradle formed by the punch mount rods 184, 210 allow the bottom portion of the punch 110 to project through and be exposed to the linear LED beam that is projected in a substantially horizontal direction and substantially parallel to the granite plate 114 by LED linear arrays 140, 142 (FIG. 6). In this fashion, the outside dimensions of the punch 110 can be measured, since the punch 110 will cast a shadow because of the fact that both the top surface and the bottom surface of the punch 110 are exposed to the linear beam created by LED linear arrays 140, 142. Die fixture plates 176, 178 laterally support the die 164. Die 164 rests on the fixture mount rods 168, 170, so that both the top and bottom surfaces of the die 164 are visible from a substantially horizontal direction, as illustrated in FIG. 19. In this manner, the linear light beam that is projected in a substantially horizontal direction and substantially parallel to the granite plate 114 intersect with both the top and bottom surfaces of the die 164, so that the top and bottom surfaces of the die 164 cast a shadow on the optical photodetector linear arrays 144, 146. In this manner, the outside dimensions of the die 164 can be measured by the tool measurement device 100. As also shown in FIG. 19, die fixture plates 180, 182 are clamped to the fixture mount rods 168, 170. Die 112 is supported by the remaining die fixtures 124, so that the inner opening of die 112 can be measured. The die fixtures 124 hold the die 112 so that the surfaces of the inner opening of the die 112 cast a shadow from the linear light beam generated by LED linear arrays 140, 142 onto the optical photodetector linear arrays 144, 146 (FIG. 6).

Figure 20:
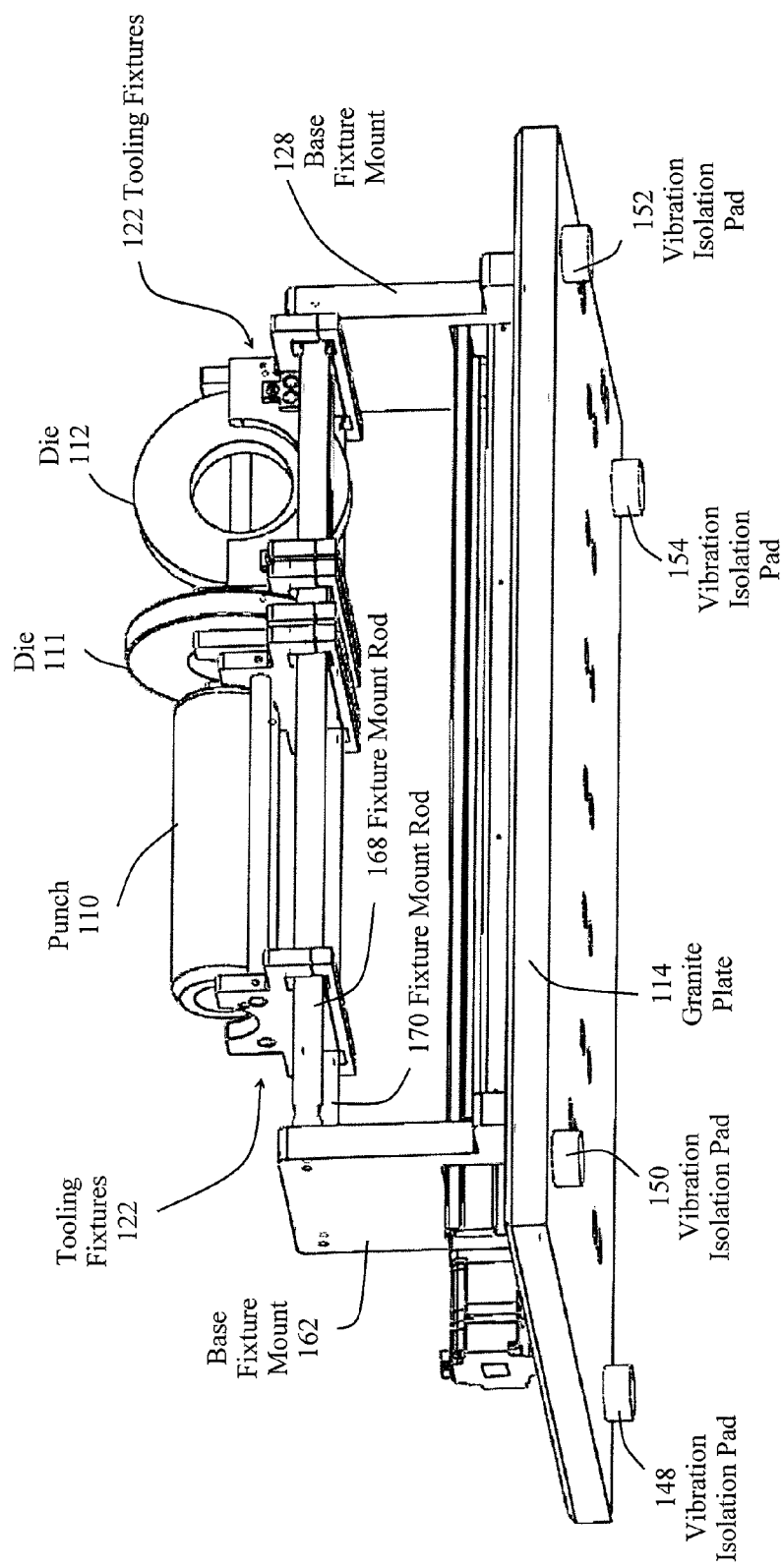
FIG. 20 is another isometric view of the embodiment of FIG. 16.

FIG. 20 is another perspective view of the embodiment of FIG. 19. As shown in FIG. 20, the vibration isolation pads 148, 150, 152, 154 are connected to the bottom of the granite plate 114 and provide substantial vibrational isolation for the mechanisms illustrated in FIG. 20. Again, as illustrated in FIG. 20, the base fixture mounts 128, 162 are connected to and support the fixture mount rods 168, 170. The tooling fixtures 122 are then connected to the fixture mount rods 168, 170. The fixture mount rods 168, 170 elevate the tooling fixtures 122, so that the tools, including punch 110, die 111 and die 112 are elevated, which causes the tools to cast a profile shadow from the linear light beam generated by LED linear arrays 140, 142 onto the optical photodetector linear arrays 144, 146.

Figure 21:
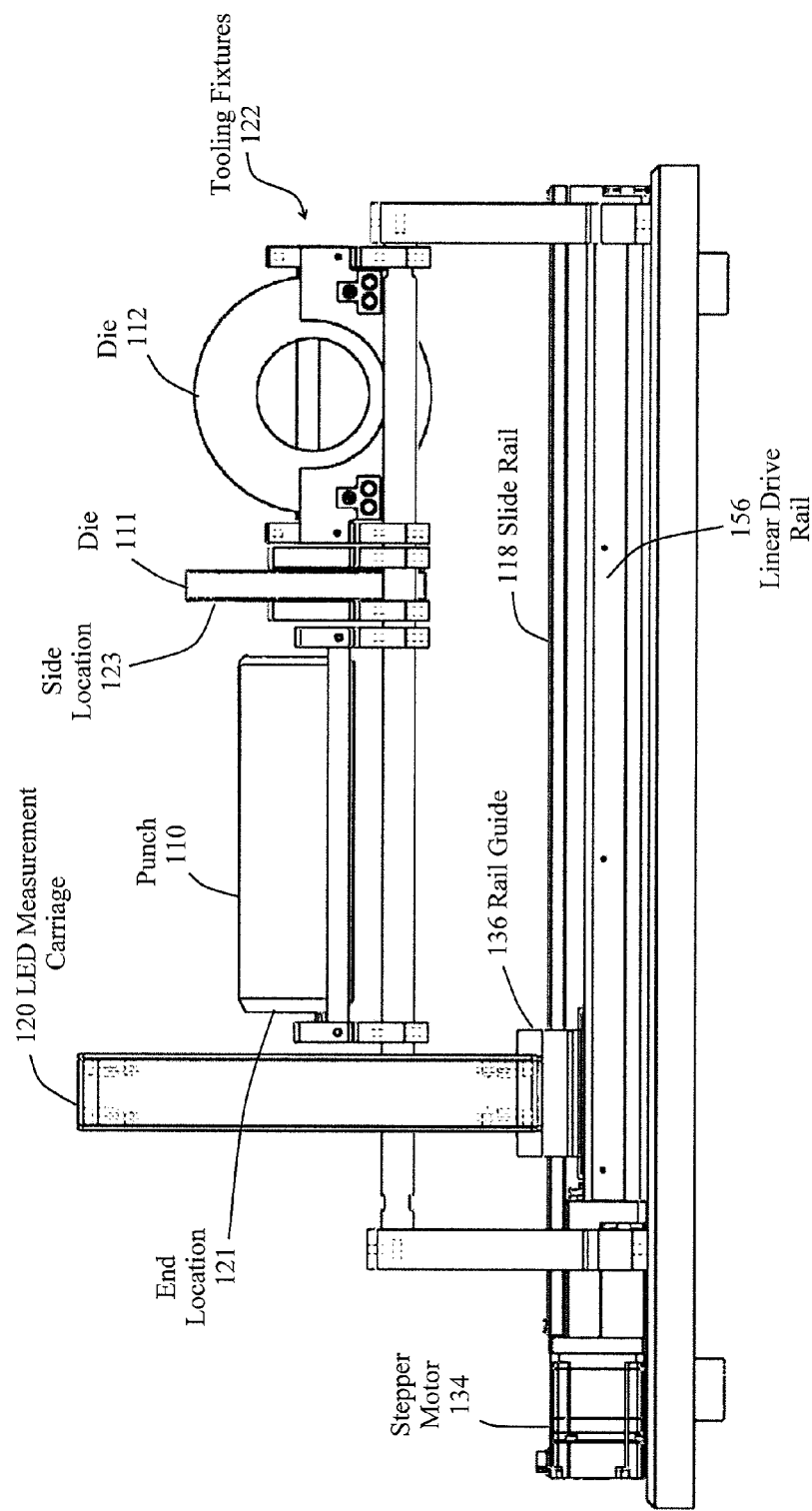
FIG. 21 is a side view of the embodiment of FIG. 16 with the LED measurement carriage in a start position.

FIG. 21 is a side view illustrating a portion of the tool measuring device 100 of the embodiment of FIG. 1. As illustrated in FIG. 21, stepper motor 134 is coupled to the linear drive 156, which drives the rail guide 136 along the slide rail 118. Rail guide 136 is coupled to the LED measurement carriage 120, so that the LED measurement carriage 120 is moved by the rail guide 136. As shown in FIG. 21, the LED measurement carriage 120 is in a first position that is prior to the start of taking measurements of the tools, such as punch 110, die 111 and die 112. When the stepper motor 134 receives control signals to operate the stepper motor 134 from the processing and electronics package 107 (FIG. 1), the stepper motor rotates in small partial rotational steps that moves the rail guide 136 in response to rotation of a threaded drive rod 212 (FIG. 34) in the linear drive rail 156, as disclosed in more detail below. The rail guide 136 causes the LED measurement carriage 120 to pass over the punch 110. The projection of the linear beam generated by the LED linear arrays 140, 142 allows the end portion 121 of the punch 110 to be detected. In this manner, the location of the punch 110 is identified and measurements of the size of the punch 110 can be referenced to the end location 121 of the punch 110. In this manner, very accurate locations on the punch 110 can be referenced to the end location 121 that is detected by the LED measurement carriage 120. The process of just simply abutting punch 110 against one of the fixture plates, or other abutment, is not as accurate as simply measuring the punch 110 from the end location 121. Measurements by the tool measurement device 100 are made in millionths of an inch. Simply abutting the punch 110 against an abutment surface will not provide the desired accuracy for these types of precise measurements. Similarly, the side location 123 of die 111 is detected by the LED measurement carriage 120 so that measurements of the outer surface of the die 111 can be taken and referenced to the side location 123 of die 111 in a very accurate manner. LED measurement carriage 120 also passes over die 112 and measures the diameter of the inner opening 125 of the die 112. The elevated positioning of the tools, including punch 110, die 111 and die 112, on the tooling fixtures 122, allows the entire profile of the tools to be imaged when the LED measurement carriage 120 passes over the tools, including punch 110, die 111 and die 112.

Figure 22:
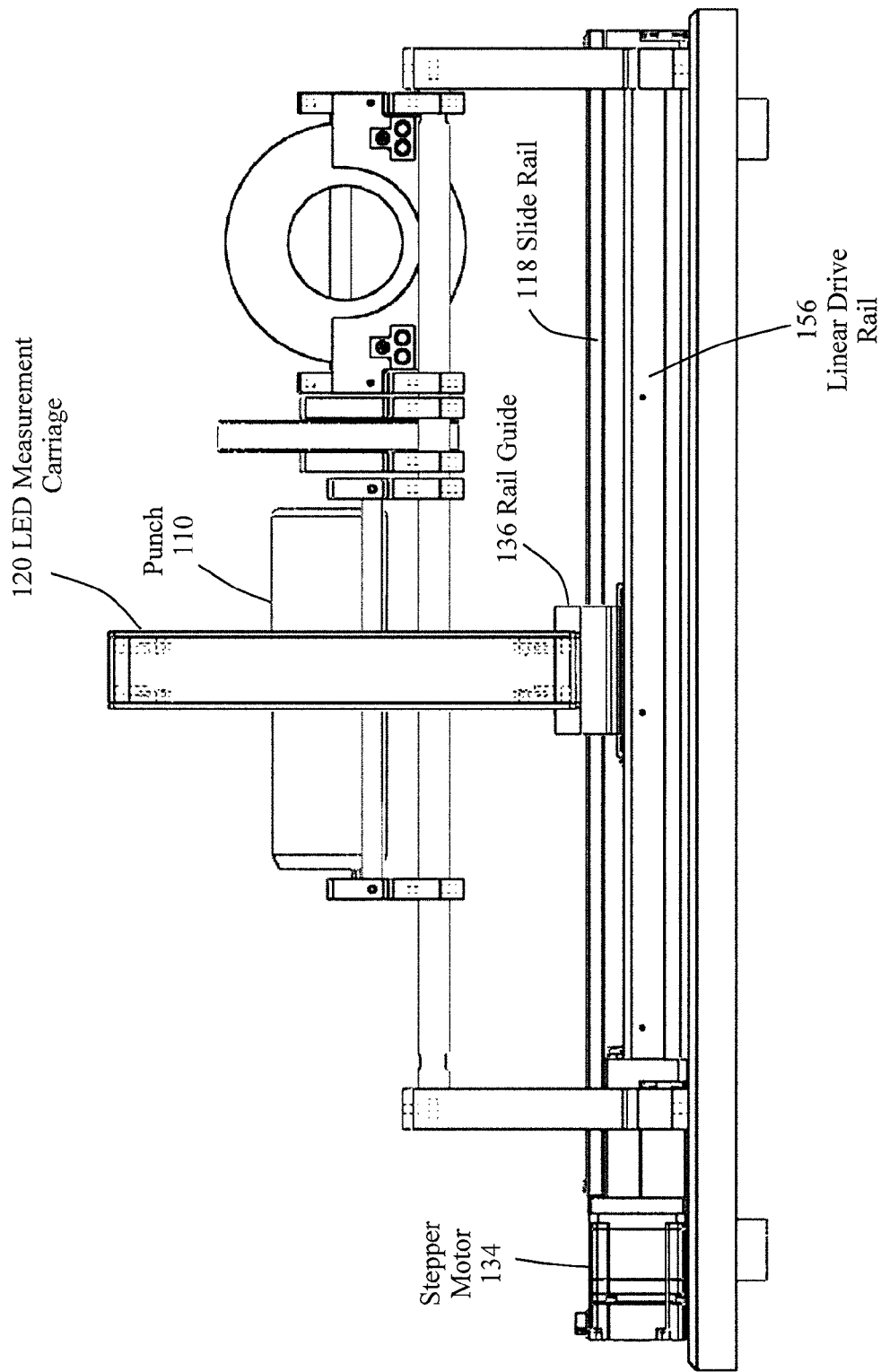
FIG. 22 is a side view of the embodiment of FIG. 21 with the LED measurement carriage in a first measurement position.

FIG. 22 is a side view of the embodiment of FIG. 21 with the LED measurement carriage 120 moved to a second position in which the outer profile dimensions of the punch 110 are being measured by the LED measurement carriage 120. As illustrated in FIG. 22, both the upper and lower surface of the punch 110 are visible in the side view of FIG. 22, so that the punch 110 casts a shadow on the linear beam that is projected by the LED linear arrays 140, 142. The LED measurement carriage 120 is moved by stepper motor 134, which is coupled to linear drive rail 156. Linear drive rail 156 is coupled to the rail guide 136, so that the rail guide moves along the slide rail 118 to the selected positions that are controlled by the processing and electronics package 107 that generates the control signals to move stepper motor 134.

Figure 23:
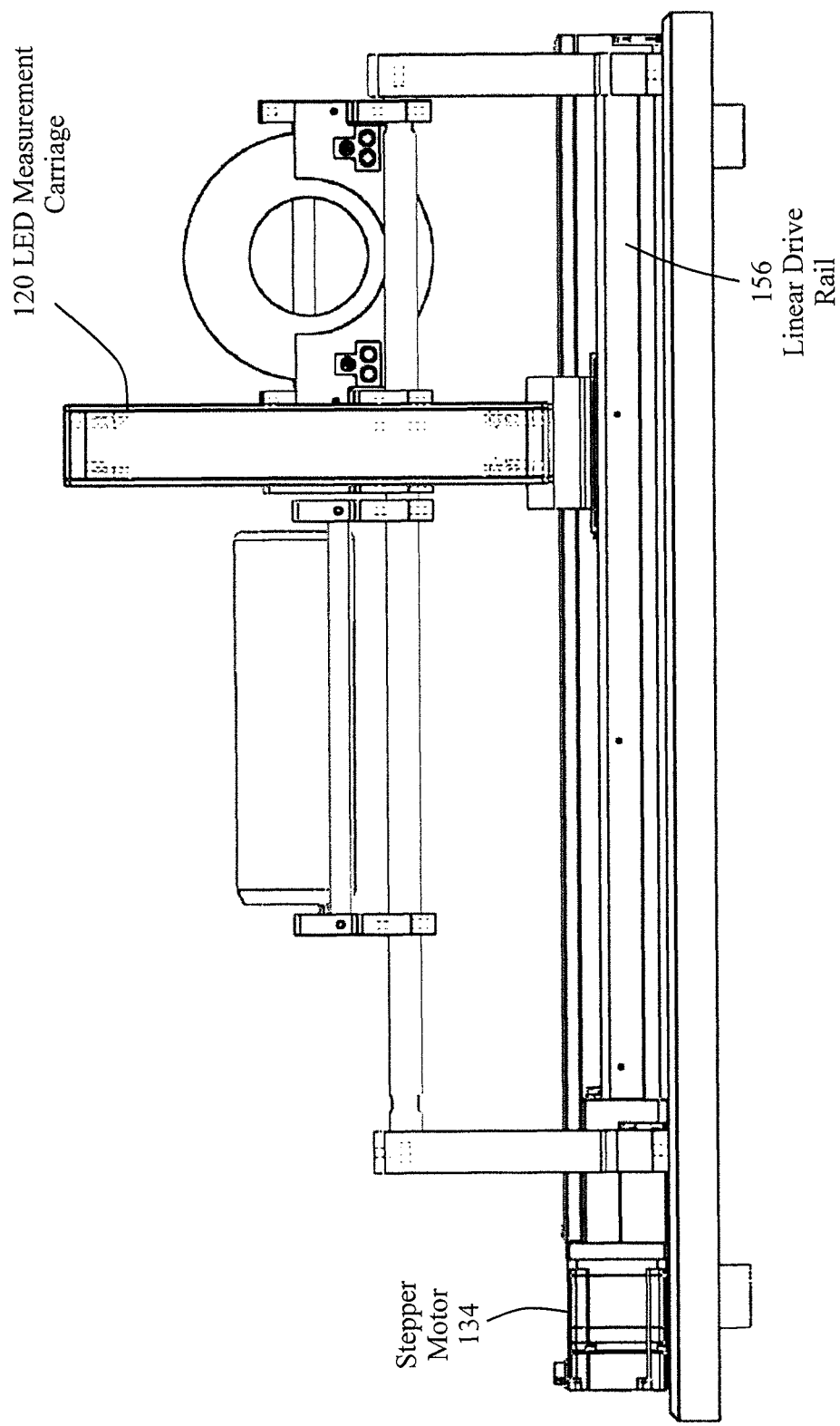
FIG. 23 is an illustration of the embodiment of FIG. 21 with the LED measurement carriage in a second measurement position.

FIG. 23 is a side view of the embodiment of FIG. 22 with the LED measurement carriage 120 moved to a third position to measure the outer dimensions of the die 111. Again, the LED measurement carriage 120 is moved by the stepper motor 134, which drives the linear drive rail 156.

Figure 24:
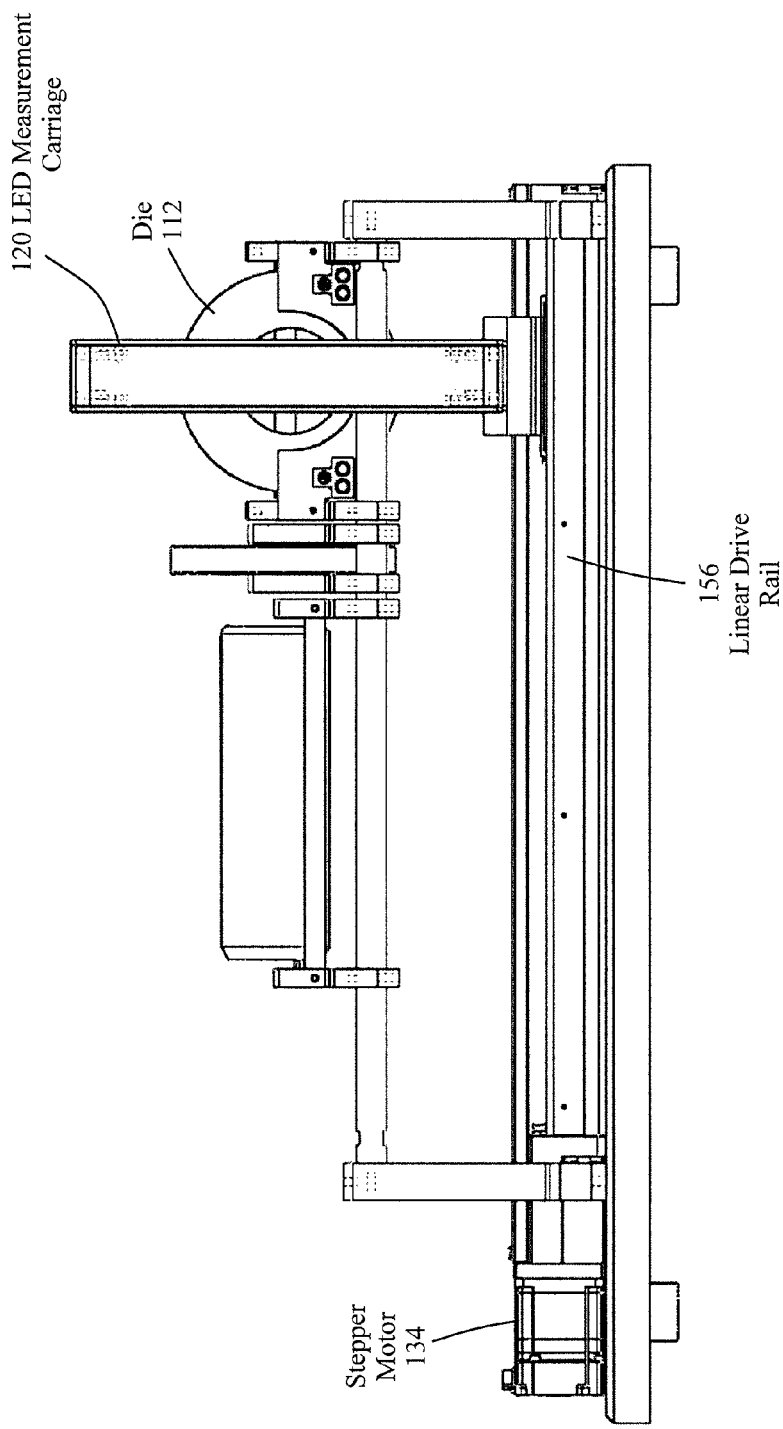
FIG. 24 is a side view of the embodiment of FIG. 21 with the LED measurement carriage in a third measurement position.

FIG. 24 is a side view of the embodiment of FIG. 23 with the LED measurement carriage 120 moved to a fourth position in which measurements are taken of die 112. Again, Stepper motor 134 is coupled to the linear drive rail 156, which moves the LED measurement carriage 120 in small incremental steps.

Figure 25:
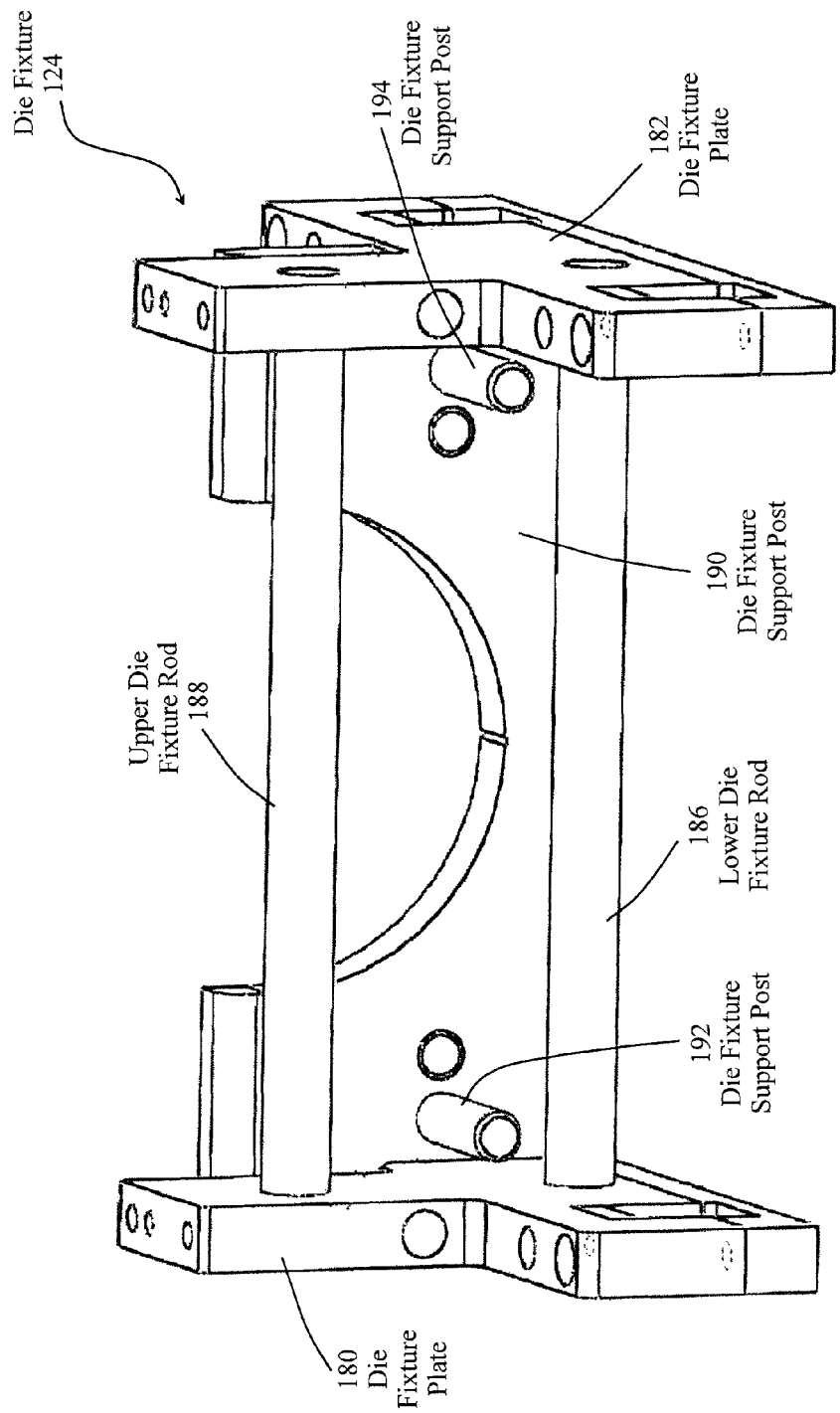
FIG. 25 is an isometric view of a die fixture.

FIG. 25 is an isometric view of die fixture 124. As illustrated in FIG. 25, die fixture 124 includes die fixture plates 180, 182 that are coupled to the punch rod mounts 184, 186. Lower die fixture rod 186 and upper die fixture rod 188 are connected to the die fixture plates 180, 182 to form a vertical support for one side of die 112. Die fixture support plate 190 is also connected to die fixture plates 180, 182 and provides a vertical support for the other side of die 112. Die fixture support posts 192, 194 provide bottom supports on which the die 112 rests in the die fixture 124.

Figure 26:
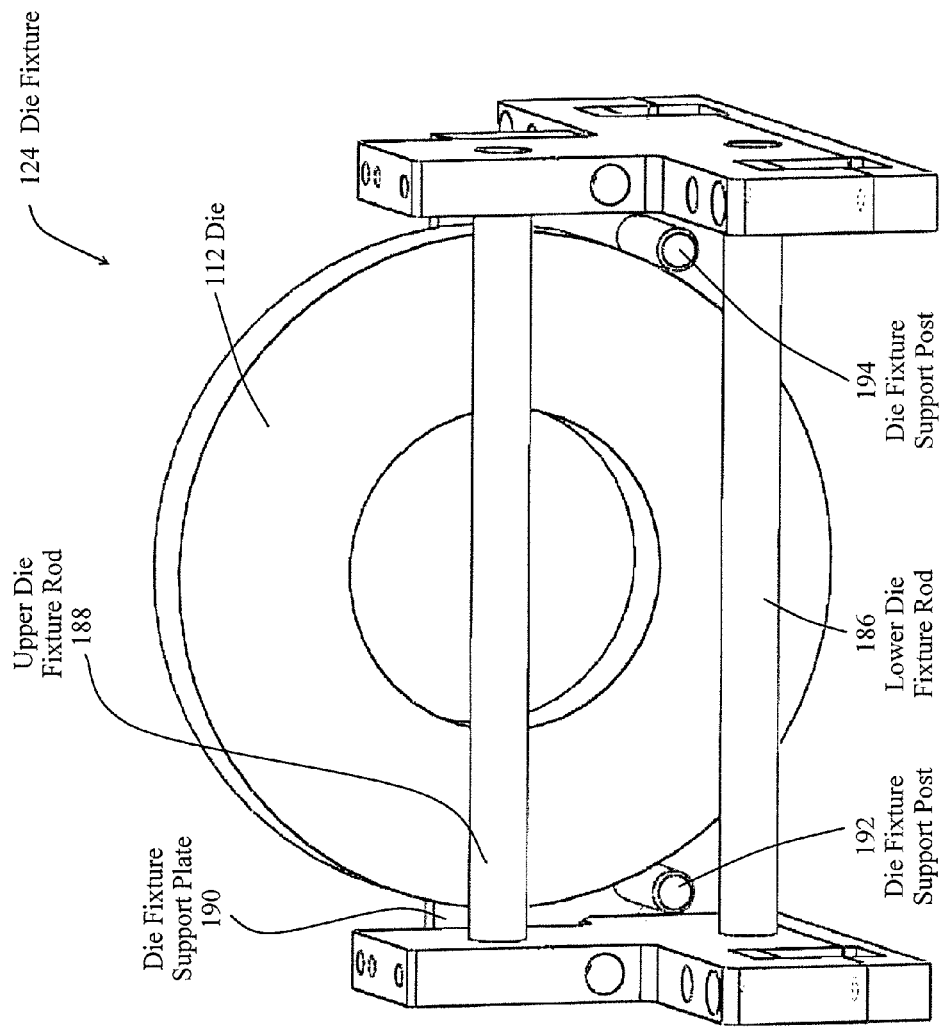
FIG. 26 is an isometric view of the embodiment of the die fixture of FIG. 25 with a die disposed in the die fixture.

FIG. 26 is an isometric view of the embodiment of the die fixture 124 illustrated in FIG. 25 with the die 112 inserted in the die fixture 124. As illustrated in FIG. 26, die 112 rests on the die fixture support posts 192, 194 and is laterally supported by die fixture support plate 190 on one side and lower die fixture rod 186 and upper die fixture rod 188 on the other side of the die 112.

Figure 27:
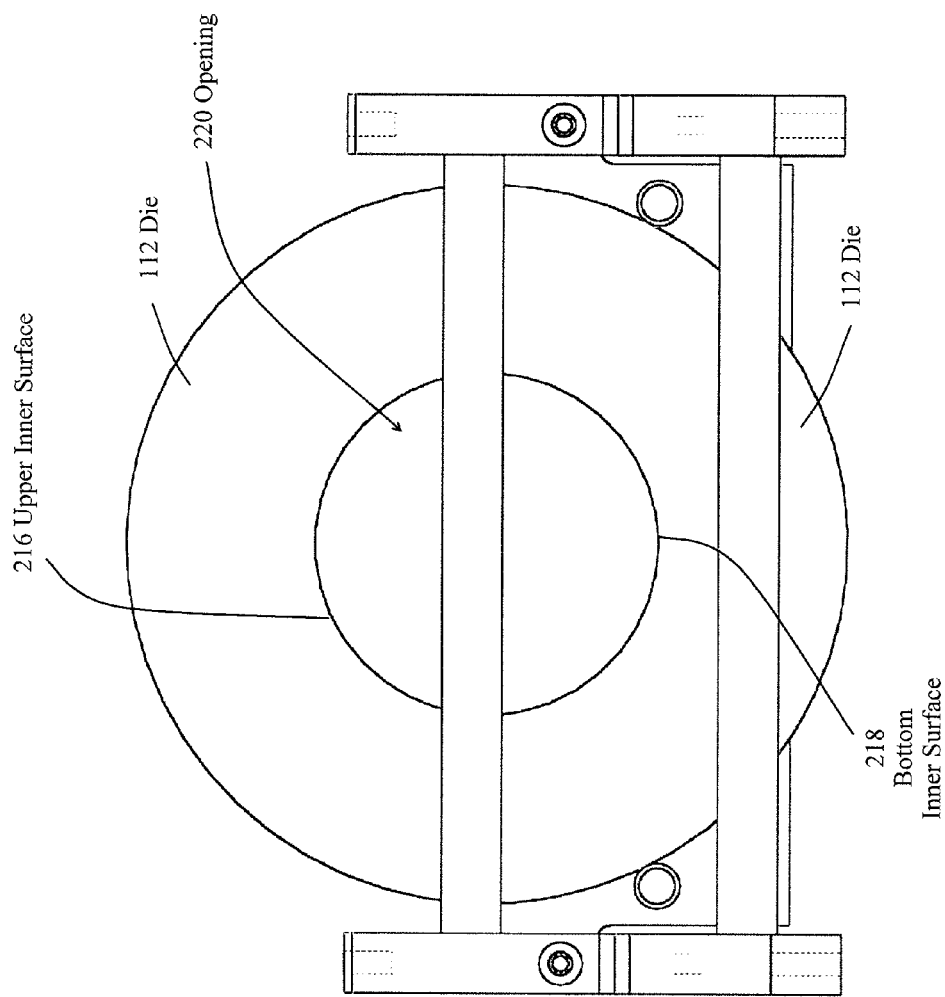
FIG. 27 is a side view of the embodiment of FIG. 26.

FIG. 27 is a side view illustrating the die 112 disposed in the die fixture 124. As illustrated in FIG. 27, die 112 has an opening 220 with an upper inner surface 216 and a lower inner surface 218. The inner surfaces of the die 112 are not obscured in the die fixture 124 and are capable of casting a shadow from the LED linear beam projected by LED linear beam arrays 240, 242 onto the optical photodetector arrays 244, 246 (FIG. 6). In this manner, the dimensions of the opening 220 can be measured by the tool measuring device 100.

Figure 28:
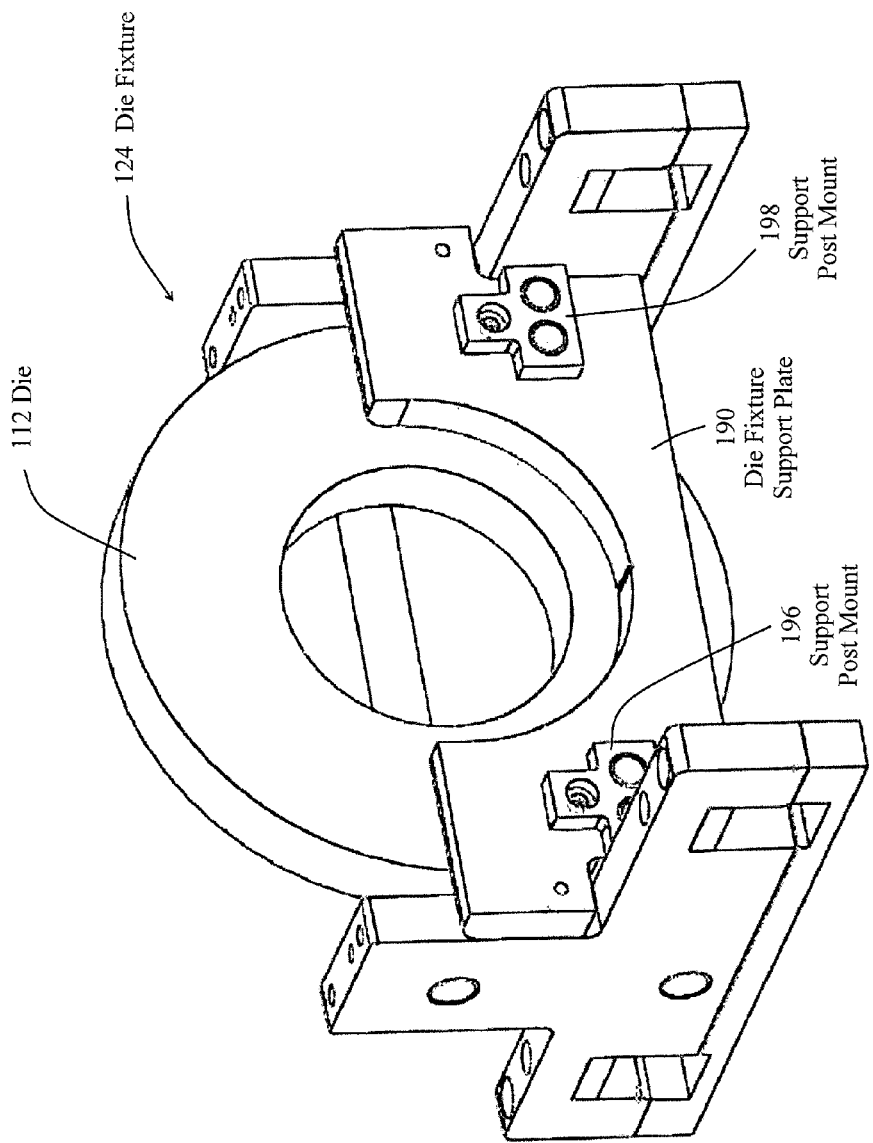
FIG. 28 is an opposite side isometric view of the embodiment of FIG. 26.

FIG. 28 is a back perspective view of the die fixture 124. As illustrated in FIG. 28, support post mounts 196, 198 are placed in the die fixture support plate 190. The support post mounts 196, 198 can be removed and positions can be swapped in the die fixture support plate 190 to provide a different support for the die 112, as explained in more detail below.

Figure 29:
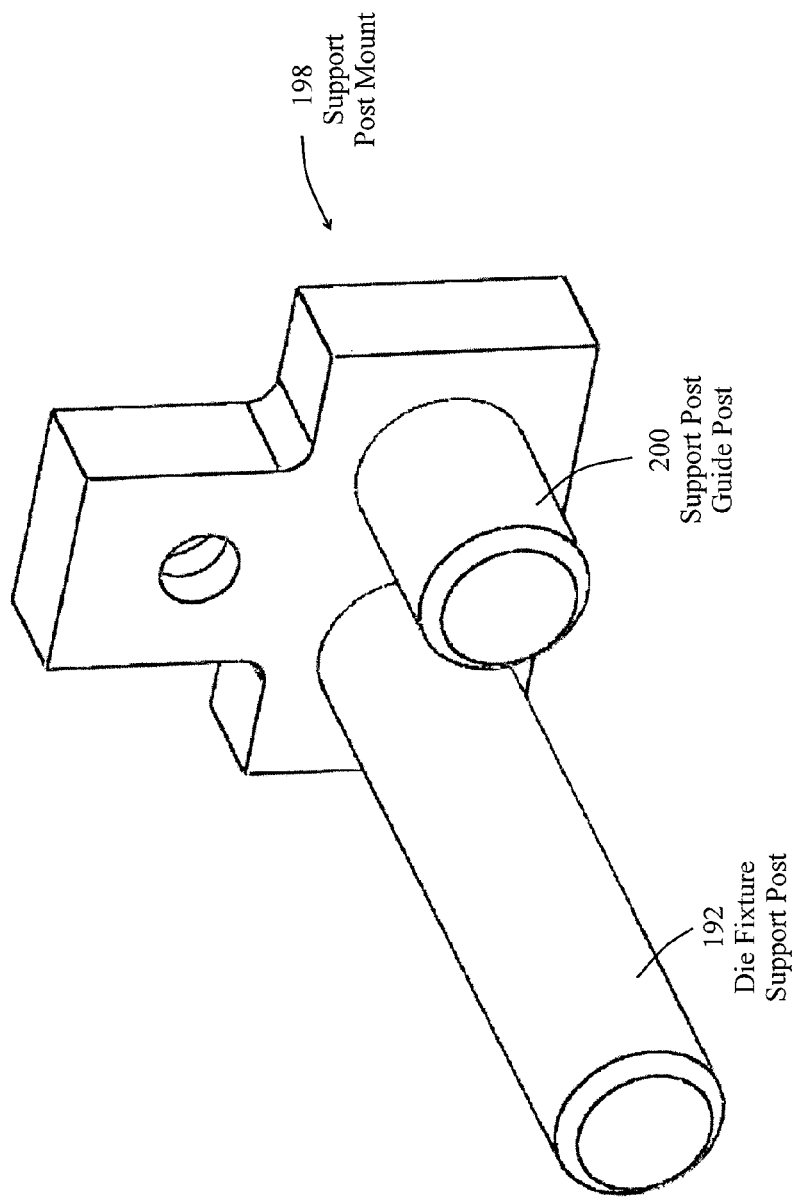
FIG. 29 is an isometric view of a support post mount.

FIG. 29 is a front isometric view of an embodiment of the support post mount 198. As illustrated in FIG. 29, the support post mount 198 has a die fixture, a support post 192 and a support post guide post 200. The die fixture support post 192 and the support post guide post 200 fit within openings in the die fixture support plate 190, as illustrated in FIG. 28. The positions of the support post mounts 196, 198 can be swapped in the die fixture support plate 190 so that the die fixture support post 192 can be disposed in either the outer opening in the die fixture support plate 190, or the inner opening in die fixture support plate 190, which changes the elevation at which the die 112 is supported in the die fixture 124, as illustrated in FIG. 28. In this manner, at least two different sizes of dies can be measured. Support post guide post 200 provides support for the support post mount 198 in the openings in the die fixture support plate 190.

Figure 30:
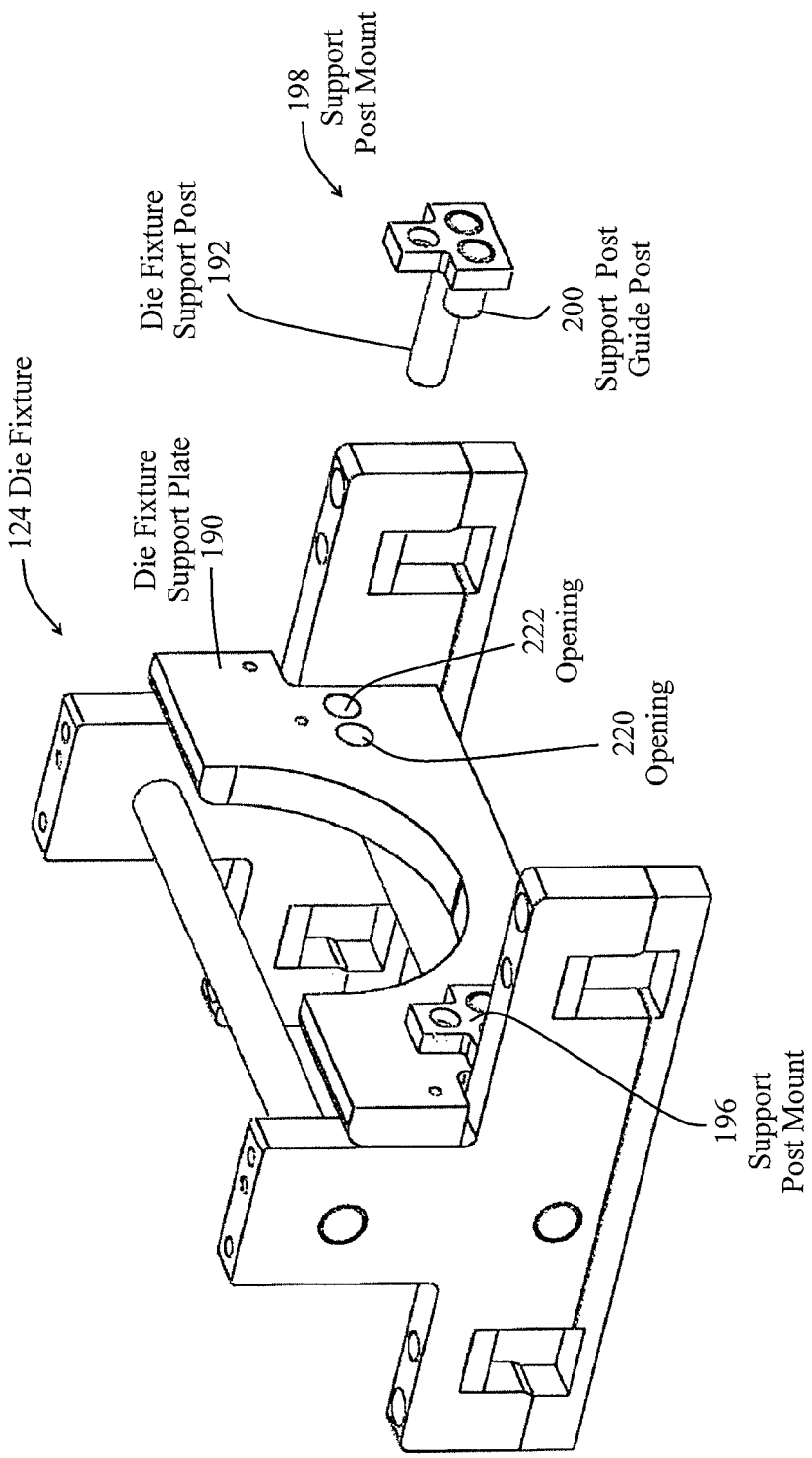
FIG. 30 is an isometric view of the die fixture with the support post mount in an exploded position.

FIG. 30 is an isometric view of the embodiment of the die fixture 124 that is disclosed in FIG. 28. As illustrated in FIG. 30, the support post mount 198 is shown in an exploded view, in which the support post mount 198 is separated from the die fixture support plate 190. As illustrated in FIG. 30, the die fixture support post 192 fits within the opening 222, while the support post guide post 200 fits within opening 220. The die fixture support post 192 extends through the die fixture support plate 190, so that the die 112 sits on the die fixture support post 192. Since the openings 220, 222 have substantially the same size, the support post mount 196 can be inserted in openings 220, 222, while the support post mount 198 can be mounted in similar openings where the support post mount 196 is inserted in the die fixture support plate 190, as shown in FIG. 30. Support post mount 196 is constructed in an opposite fashion as the support post mount 198, such that the die fixture support post 192 and the support post guide post 200 have opposite locations on the support post mount 198. By swapping support post mounts 196, 198, the die 112 can be supported at different elevations in the die fixture 124 and accommodate different size dies.

Figure 31:
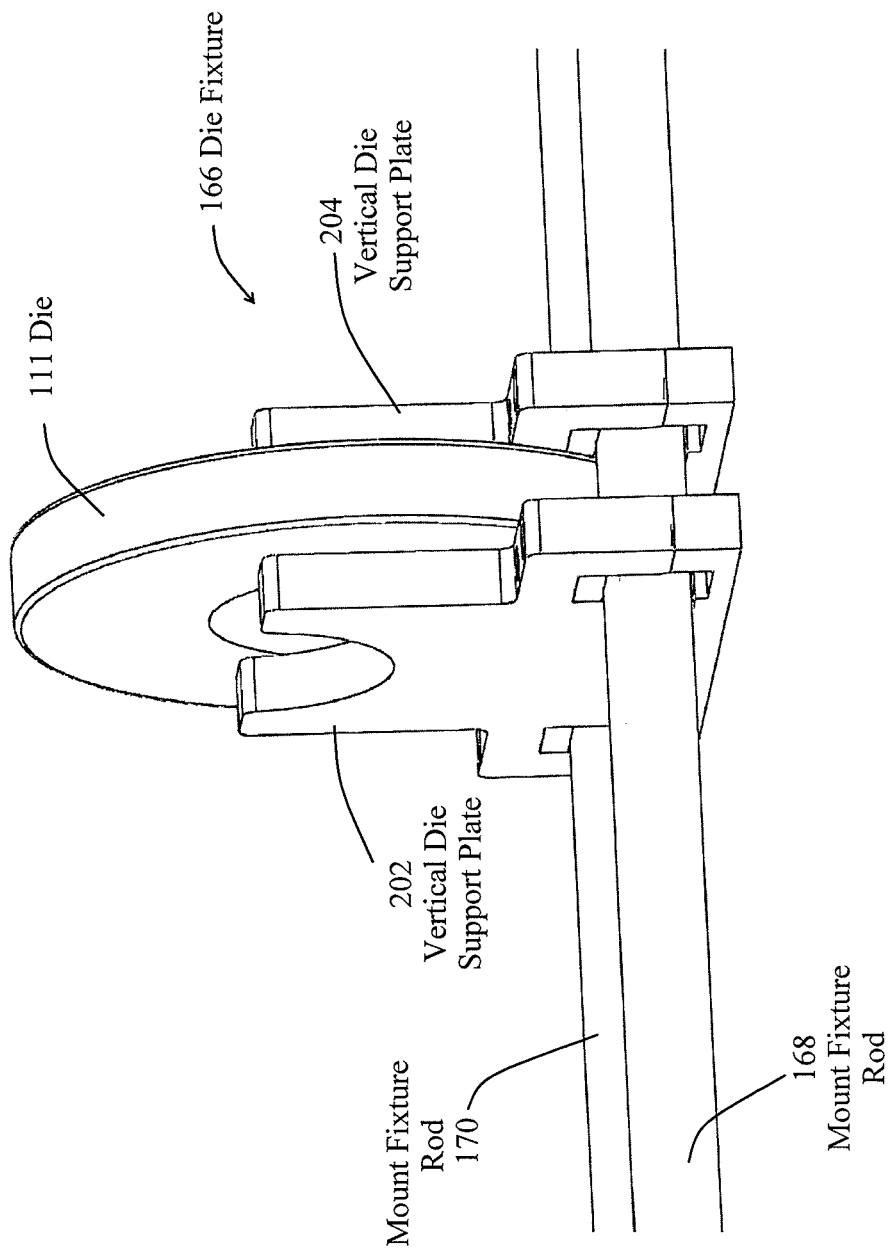
FIG. 31 is an isometric view of an embodiment of another die fixture.

FIG. 31 is an isometric view of an embodiment of the die fixture 166. As illustrated in FIG. 31, the die fixture 166 includes vertical die support plates 202, 204 that are clamped to mount fixture rods 168, 170. The die fixture 166 is used for supporting die 111 so that the dimensions of the outer surface of the die 111 can be measured.

Figure 32:
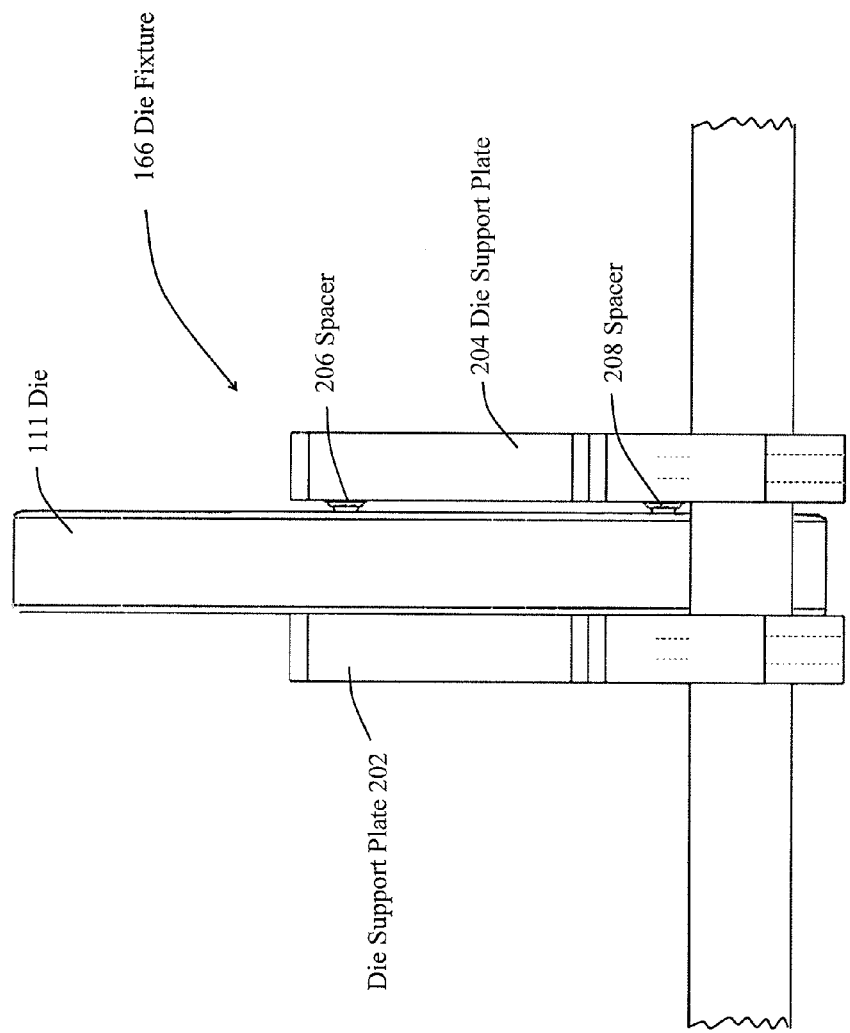
FIG. 32 is a side view of the die fixture of FIG. 31.

FIG. 32 is a side view of the embodiment of the die fixture 166. As illustrated in FIG. 32, the die 111 is supported by die support plate 202 and die support plate 204. Spacers 206, 208 on die support plate 204 cause the die 111 to be abutted against the die support plate 202 in a substantially vertical position. As illustrated in FIG. 32, both the bottom and top of the outer surface of the die 111 is visible from a horizontal direction so that the die 111 can cast a shadow from the LED linear light beam.

Figure 33:
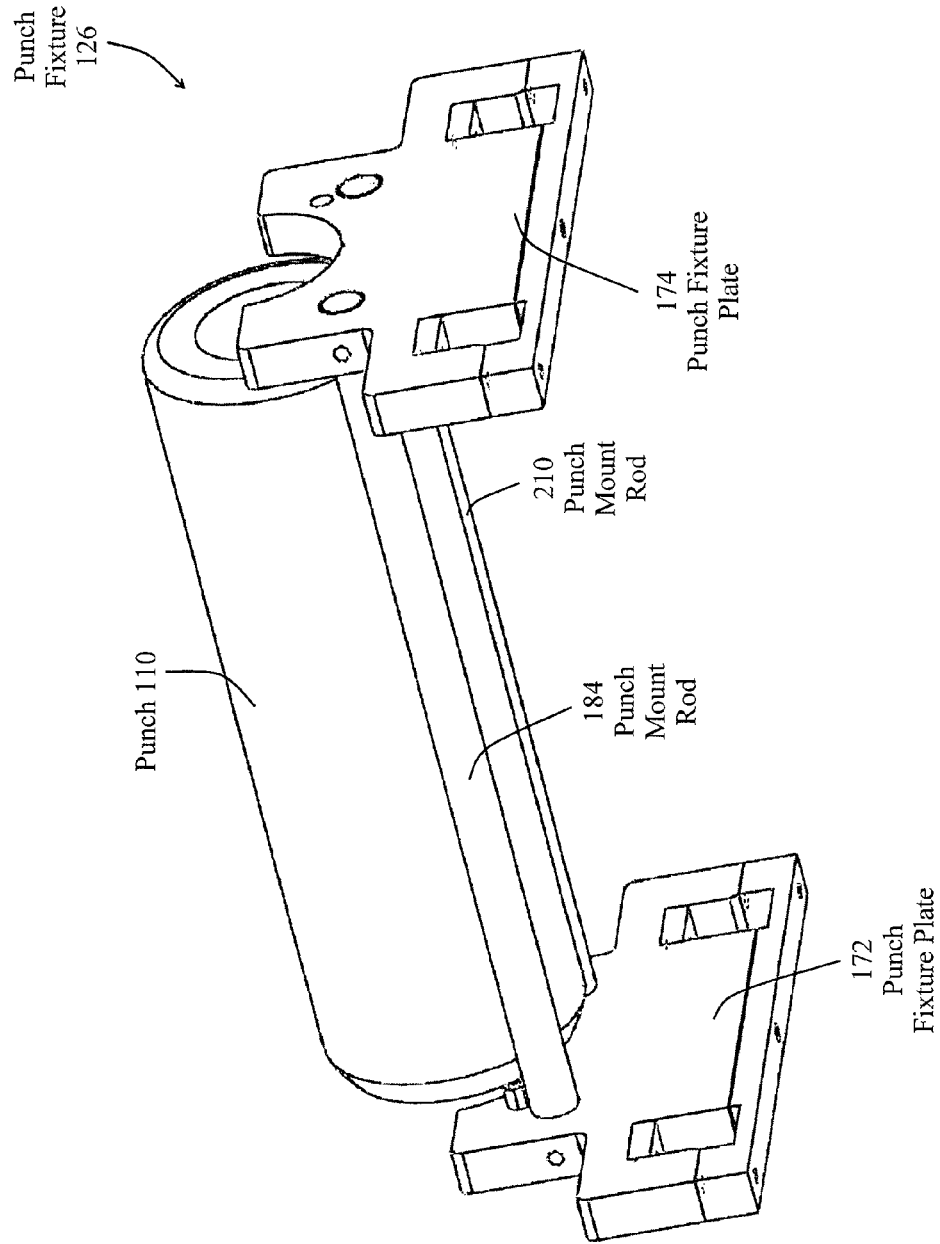
FIG. 33 is an isometric view of an embodiment of a punch fixture.

FIG. 33 is an isometric view of a bottom portion of the punch fixture 126. As illustrated in FIG. 33, the punch fixture 126 includes punch fixture plate 172 and punch fixture plate 174. Punch mount rods 184, 210 are mounted on the punch fixture plates 172, 174 and spaced apart, so that a lower portion of the punch 110 extends below the punch mount rods 184, 210. In this fashion, the outer surface of the punch 110 can cast a shadow from the top portion of the punch 110 onto the optical photodetector linear arrays 144, 146 (FIG. 6).

Figure 34:
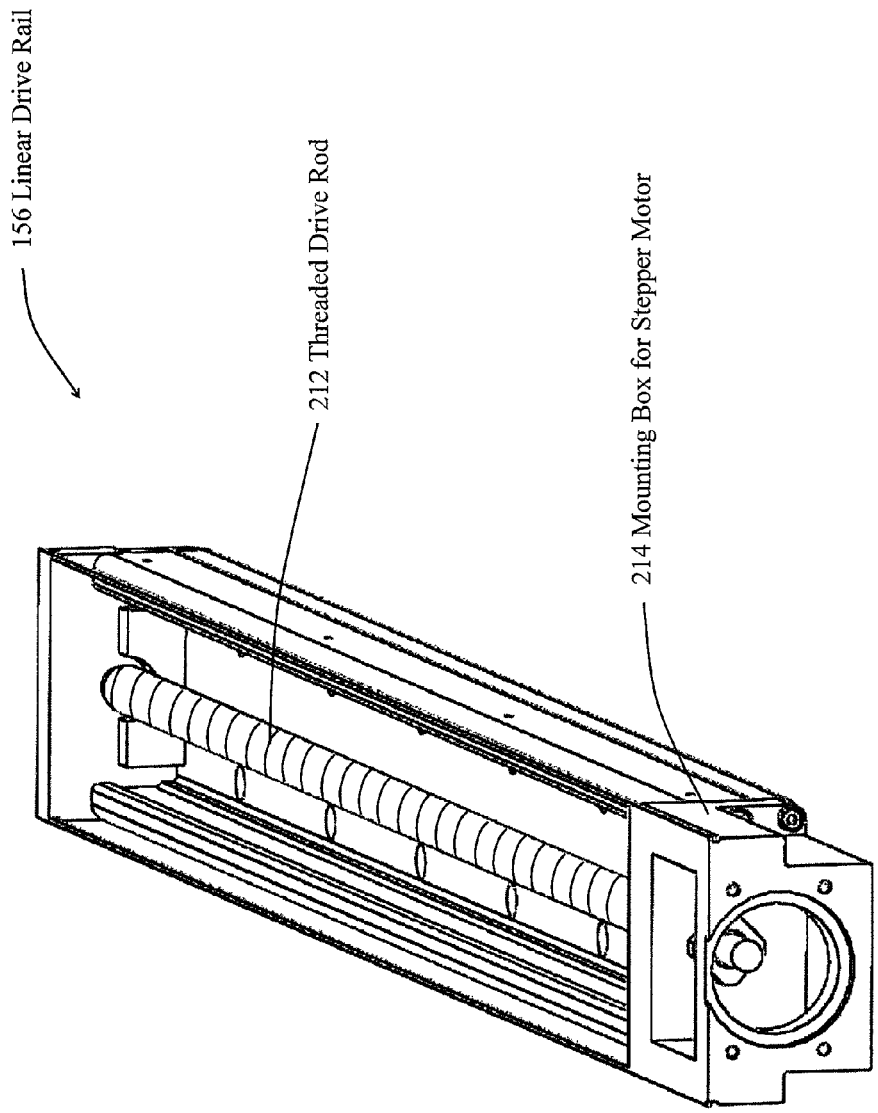
FIG. 34 is an isometric view of an embodiment of the linear drive rail.

FIG. 34 is an isometric view of an embodiment of a linear drive rail 156. As illustrated in FIG. 34, the linear drive rail 156 includes a mounting box 214 for the stepper motor 134 (FIG. 4). The stepper motor is attached to the threaded drive rod 212, which rotates in response to rotation of the stepper motor 134. Rotation of the threaded drive 212 drives the rail guide 136 (FIG. 4) that is threaded to the threaded drive rod 212.

Figure 35:
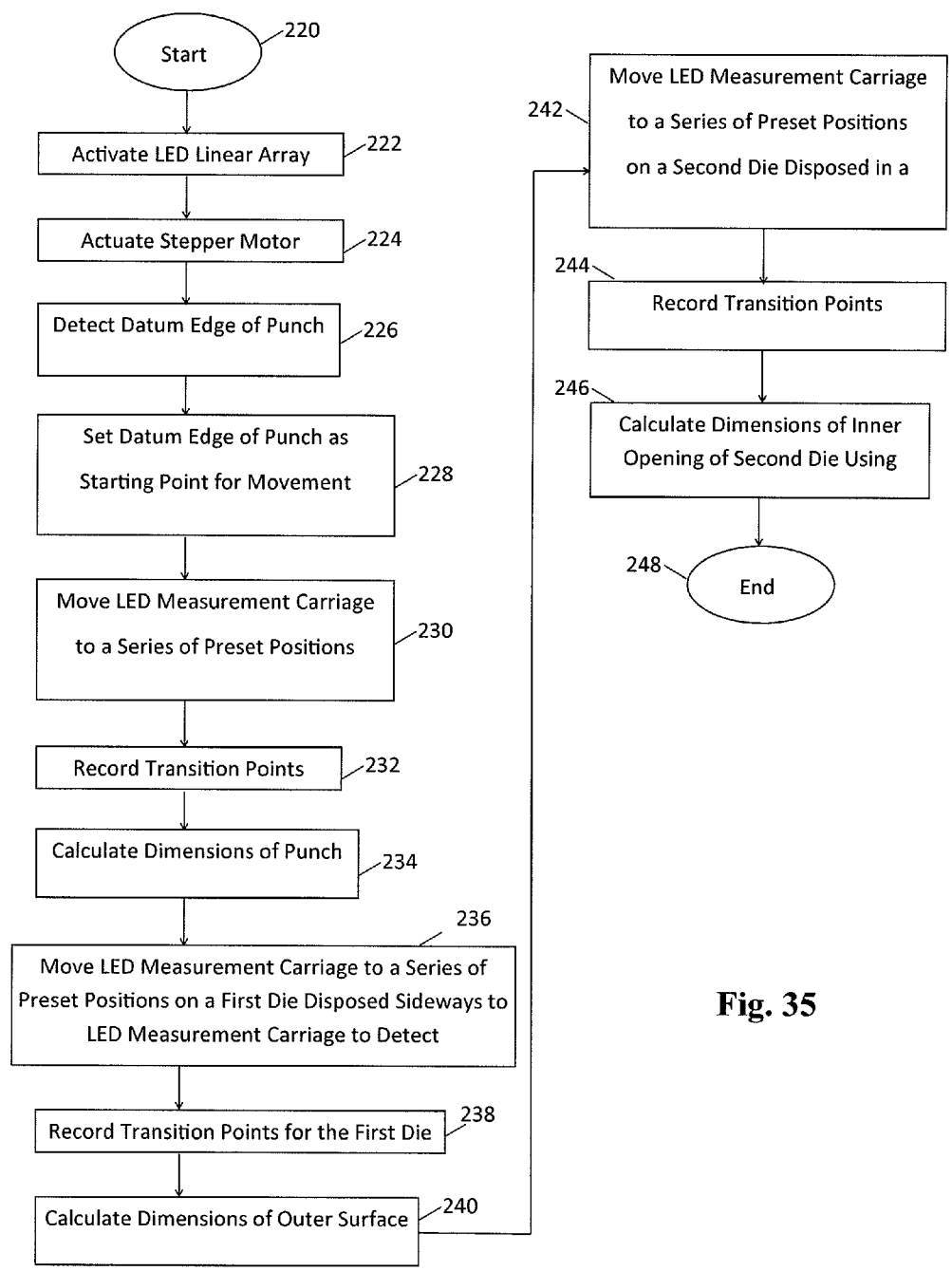
FIG. 35 is a flow chart illustrating the operation of the processing and electronics package of the tool measuring device.

FIG. 35 is a flow chart illustrating the operation of the processing and electronics package 107 of the tool measuring device 100. The process starts at step 220. At step 222, the LED array is activated, or turned on. At step 224, the stepper motor 134 is actuated, so that the LED measurement carriage 120 moves along the slide rail 118. At step 226, a datum edge of the punch is detected by determining the transition points of the optical photodetector linear array. At step 228, the datum edge of the punch is set as a starting point for movement of the stepper motor 134 along the length of the punch 110. At step 230, the LED measurement carriage 120 is moved to a series of preset locations measured from the starting point, or datum edge, of the punch 110 to a series of preset locations along the length of the punch 110 to detect transition points for the punch. In other words, the optical photodetector linear array detects the transition points from the light to dark photodetector pixels to determine the profile of the outer portions of the punch 110, which are indicated by the transition points. At step 232, the processing and electronics package 107 records the transition points for the punch. The dimensions of the punch 110 are then calculated using these transition points at step 234. The calculation is performed by determining the distance between the transition points. This process may use a punch that is highly calibrated to calibrate the processing and electronics package 107. Once the system is calibrated, the locations of the transition points can be used to extrapolate the dimensions of each newly measured punch. At step 236, the LED measurement carriage is moved in a series of preset positions on a first die, such as die 111, that is disposed sideways to the LED measurement carriage 120, to detect transition points of the outer surfaces of the first die 111. As shown in FIG. 4, the outer surfaces of the die 111 can be detected using the LED measurement carriage, since the outer surfaces are exposed to the LED measurement carriage when the die 111 is mounted in the die fixture 166 (FIG. 31). The transition points for the first die are then recorded at step 238. At step 240, the dimensions of the outer surface of the first die are calculated using the transition points in the same manner as described above. At step 242, the LED measurement carriage is moved to a series of preset positions on a second die 112 that is disposed in a position facing the LED measurement carriage 120, as illustrated in FIG. 4, to detect the transition points of the inner opening 220 (FIG. 27) of the second die 112. These transition points are then recorded for the second die 112 at step 244. At step 246, the dimensions of the inner opening 220, which is the maximum distance between the upper inner surface 216 and the bottom inner surface 218, as illustrated in FIG. 27, are calculated for the second die 112 using the transition points of the second die 112. The process then ends at step 248.

Hence, the embodiments of the tool measuring device 100 disclosed herein are capable of accurately measuring multiple tools by moving an LED measurement carriage 120 over and around the tools, so that the tools cast a shadow of an LED linear light beam to determine transition points. The location of the LED measurement carriage 120 can be carefully controlled, so that a profile of measurements of the tools can be provided. A display 106 can display pertinent information that is processed by processing and electronics package 107. In this manner, highly accurate and repeatable measurements can be made of various parts of the tools.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A measurement device for measuring tools for making aluminum can bodies comprising:
   a vibrational isolation plate that provides vibrational resistance and forms a mounting surface for said measurement device;
   base mount fixtures attached to said mounting surface;
   fixture mount rods attached to said base mount fixtures substantially parallel to said mounting surface;
   tooling fixtures attached to said fixture mount rods that support said tools in an elevated position above said mounting surface for measurement;
   a measurement carriage comprising:
      a carriage frame that forms a central opening;
      at least one light emitting diode linear array that is disposed on said carriage frame to emit a linear light beam that is projected across said central opening;
      at least one optical photodetector linear array that is disposed on said carriage frame to receive said linear light beam across said central opening;
   a rail that is disposed between said base mount fixtures;
   a rail guide coupled to said rail and to said carriage frame;
   a linear drive rail coupled to said rail guide that moves said rail guide and said carriage frame along said rail between said base mount fixtures so that said tools that are disposed in said tooling fixture in an elevated position above said mounting surface cast a shadow on said portions of said tools to be measured.

2. The measurement device of claim 1 further comprising:
   a stepper motor coupled to said linear drive rail to drive said linear drive rail.

3. The measurement device of claim 1 wherein said base mount fixtures are attached to said mounting surface so that said measurement carriage can pass over said tools while said tools are disposed in said tooling fixtures.

4. A method of measuring tools for making aluminum can bodies comprising:
   attaching base mount fixtures to a mounting surface of a vibration resistant isolation plate with a predetermined spacing between said base mount fixtures;
   attaching fixture mount rods to said base mount fixtures so that said fixture mount rods are substantially parallel to said mounting surface;
   attaching tooling fixtures to said fixture mount rods to support said tools in an elevated position above said mounting surface;
   attaching a rail to said mounting surface between said base mount fixtures;
   attaching a rail guide to said rail;
   forming a measurement carriage comprising:
      forming a carriage frame that has a central opening;
      attaching at least one light emitting diode linear array to said carriage frame so that a linear light beam projects across said central opening;
      attaching at least one optical photodetector linear array to say carriage frame in a position to receive said linear light beam that is projected across said central opening;
   attaching said measurement carriage to said rail guide;
   moving said rail guide along said rail between said base mount fixtures so that said tools, that are supported in said elevated position in said tooling fixtures, pass through said central opening and cast a shadow of portions of said tools to be measured on said at least one optical photodetector linear array.

5. The method of claim 4 wherein said process of moving said rail guide comprises:

moving a linear drive rail, that is coupled to said rail guide, using a stepper motor.

* * * * *